United States Patent [19]

Hamamoto

[11] Patent Number: 5,448,713
[45] Date of Patent: Sep. 5, 1995

[54] SEMICONDUCTOR DEVICE FOR LOGICAL OPERATION PROCESSING AND METHOD OF OPERATION PROCESSING THEREFOR

[75] Inventor: Takeshi Hamamoto, Hyogo, Japan

[73] Assignee: Mitsubishi Denki Kabushiki Kaisha, Tokyo, Japan

[21] Appl. No.: 218,958

[22] Filed: Mar. 28, 1994

Related U.S. Application Data

[62] Division of Ser. No. 638,722, Jan. 3, 1991, Pat. No. 5,299,283.

[30] Foreign Application Priority Data

Jan. 29, 1990 [JP] Japan .................... 2-19451

[51] Int. Cl.$^6$ ............ G06F 13/28; G06F 15/18; G11C 15/04; G06G 7/00
[52] U.S. Cl. ................... 395/481; 395/3; 395/21; 395/61; 395/412; 395/900; 364/715.01; 364/715.06; 364/DIG. 1; 365/49
[58] Field of Search .............. 395/3, 900, 21, 61, 395/425, 400; 364/715.01, 715.06, DIG. 1; 365/49

[56] References Cited

U.S. PATENT DOCUMENTS

| | | | |
|---|---|---|---|
| 4,845,661 | 7/1989 | Shimada | 364/900 |
| 4,965,767 | 10/1990 | Kinoshita et al. | 365/49 |
| 4,989,256 | 1/1991 | Buckley | 382/15 |
| 5,126,600 | 6/1992 | Zhang | 395/3 |
| 5,167,005 | 11/1992 | Yamakawa | 395/3 |
| 5,218,684 | 6/1993 | Hayes et al. | 395/400 |
| 5,299,962 | 7/1993 | Yuh et al. | 365/162 |

FOREIGN PATENT DOCUMENTS 208787 8/1990 Japan .............. G06G 7/12

OTHER PUBLICATIONS

Nikkei Electronics, No. 426, Jul. 27, 1987, pp. 129-152.
Nikkei Electronics, No. 457, Oct. 3, 1988, pp. 157-168.
Togai et al., "Expert System on a Chip: An Engine for Real-time Approximate Reasoning", IEEE Expert, Fall 1986, pp. 55-62.

Primary Examiner—Robert W. Downs
Assistant Examiner—Richmond Dorvil
Attorney, Agent, or Firm—Lowe, Price, LeBlanc & Becker

[57] ABSTRACT

A device for executing fuzzy inference includes a first storage area constituting a condition portion of a fuzzy set and a second storage area constituting a conclusion portion of the fuzzy set. The first storage area stores membership functions of the condition portion in order to develop a first bit mapping while the second storage area stores membership functions of the conclusion portion in order to develop a second bit mapping. Each of the first and second storage areas has X addresses which are designated by an input signal and Y addresses which are designated by a membership value. The device further includes circuitry for detecting corresponding rows of the first and second storage areas on which signal potentials are both a logical true after application of input signals to the first and second storage areas, other circuitry for detecting a Y address specifying a highest-order row among the detected rows, and additional circuitry for deriving a membership value in accordance with the detected Y address. The first and second storage areas preferably each include an array of content addressable memory cells having X addresses applied by an input pattern. A row detecting circuit detects coincidence/non-coincidence of signal potentials on coincidence detection lines of the content addressable memory cell arrays. The construction realizes a device for executing fuzzy inference which is not limited by the number of rules or inputs and executes MIN-MAX operations at a high speed.

12 Claims, 11 Drawing Sheets

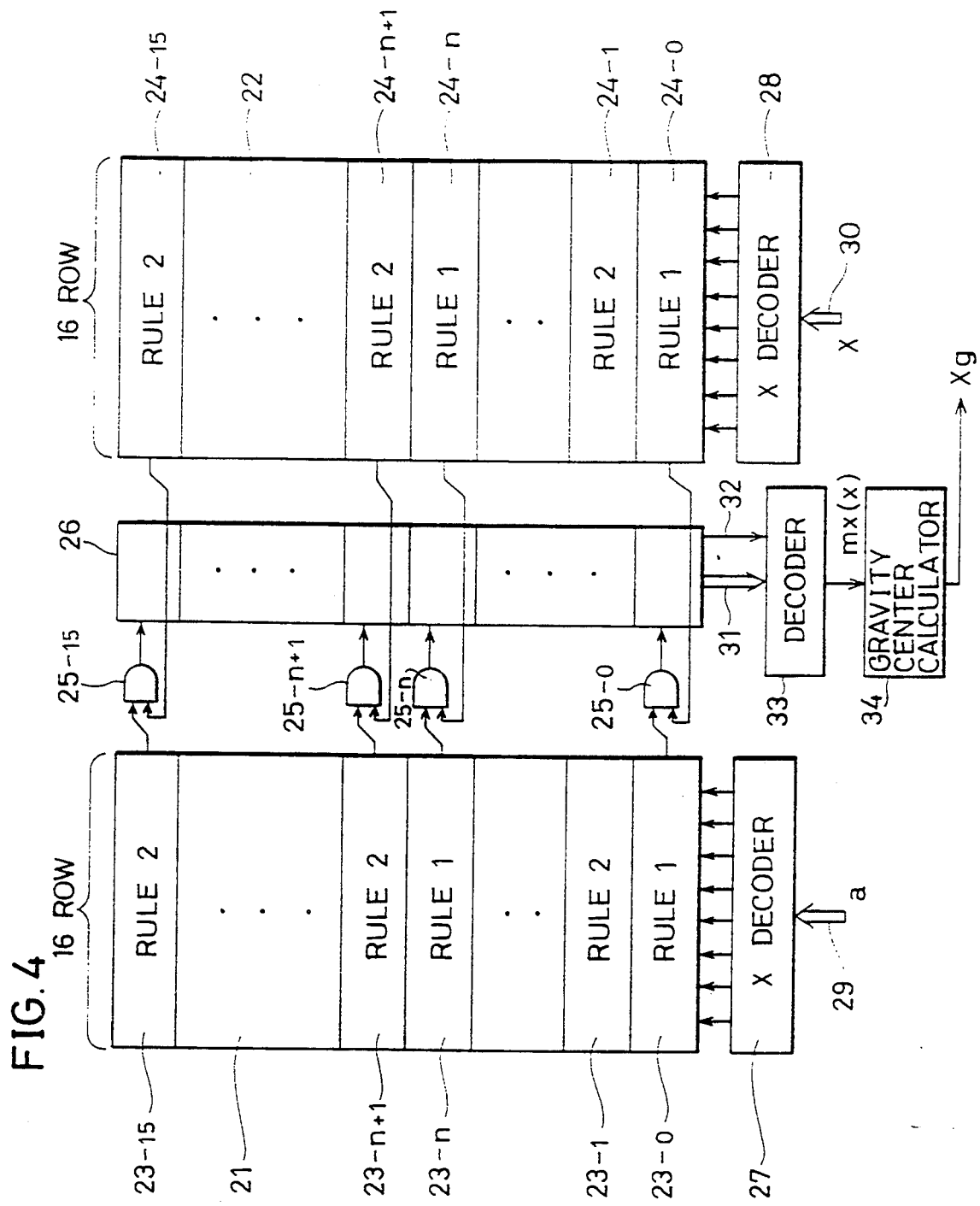

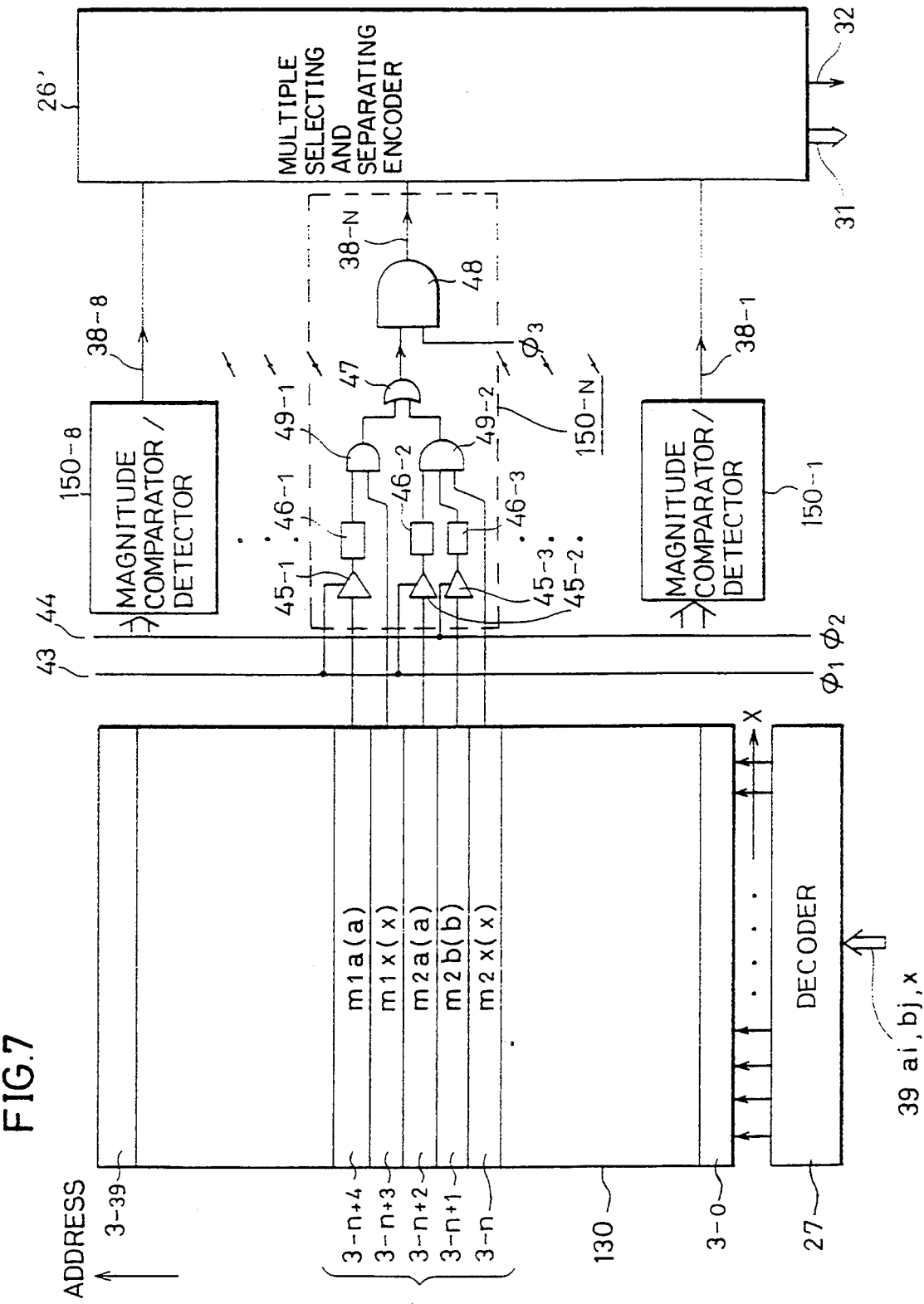

$Z = \text{MIN} \{f(x), g(x)\}$ $Z = \text{MAX} \{p(x), q(x)\}$

SEMICONDUCTOR DEVICE FOR LOGICAL OPERATION PROCESSING AND METHOD OF OPERATION PROCESSING THEREFOR

This application is a divisional of U.S. Ser. No. 07/638,722, filed Jan. 3, 1991, now U.S. Pat. No. 5,299,283, issued Mar. 29, 1994.

BACKGROUND OF THE INVENTION

1. Field of the Invention

The invention relates generally to semiconductor devices for operation processings, and more particularly to a semiconductor device which executes inference involving ambiguity, that is, fuzzy inference.

2. Description of the Background Art

In recent years, a system which treats ambiguity in terms such as "large" or "fast" has been put into practical use. When a fuzzy theory is applied to a system, fuzzy inference is executed.

A typical method of fuzzy inference includes steps of adding results of fuzzy rules in accordance with degrees at which the individual fuzzy rules are satisfied (max-min operation), calculating the center of gravity of a result of the combination of the rules (defuzzifier) and determining the center of gravity as a conclusion of the fuzzy inference.

A fuzzy rule defines a relationship, for example, between input values A and B and an output value X in such a form as "if A=BIG and B=NORMAL, then X=SMALL". In fuzzy inference, a certain input value is converted into a value within the range of 0 through 1 for a subsequent operation. Such conversion is defined by a membership function. A membership function represents a fuzzy set and is defined for each proposition with which a fuzzy rule deals (for example, for "large", "normal" or "small").

FIG. 1 illustrates a most popular method of fuzzy inference in a case of two fuzzy rules and two input values and one output value. Referring to FIG. 1, a fuzzy rule 1 has a membership function m1a(a) which is defined with respect to an input value, a. A membership value m1a(a0) with respect to an input value a0 is calculated by substituting the input value a0 into the membership function m1a(a). Also with respect to the output value x, a membership function m1x(x) is defined.

A fuzzy set with respect to an input value, a, (provided by a membership function m1a(a)) is called a condition portion while a fuzzy set with respect to an output value x (provided by a membership function m1x(x)) is called a conclusion portion. The fuzzy rule 1 describes a rule that "if a=m1a(1), then x=m1x(1)".

Also in another fuzzy rule 2, a membership function m2a(a) is defined with respect to an input value, a, while another membership function m2b(b) is defined with respect to an input value b. Further, in the conclusion portion of the fuzzy rule 2, a membership function m2x(x) is defined with respect to an output value, x.

The fuzzy rule 2 describes a rule having two inputs and one output and thus describes a proposition that "if a=m2a(1) and b=m2b(1), then x=m2x(1)".

Generally, a fuzzy inference system includes a plurality of fuzzy rules and provides a plurality of output values because it provides output values from the respective rules with respect to a plurality of input values. A method of fuzzy inference will be described with reference to FIG. 1.

It is assumed that, in the system represented by the fuzzy set of FIG. 1, input values a0 and b0 are provided as input variables a and b. At the condition portion of the fuzzy rule 1, a membership value m1a(a0) is calculated in accordance with the membership function m1a(a). At the condition portion of the fuzzy rule 2, membership values m2a(a0) and m2b(b0) are calculated in accordance with the membership functions m2a(a) and m2b(b). Consequently, degrees at which the individual input values satisfy the respective conditions are calculated.

In order to determine the degrees at which the input values a0 and b0 satisfy the rules, a minimum value among membership values is found out for each of the rules. Such calculation is called a MIN operation. As seen from FIG. 1, m1a(a0) is a minimum value in the rule 1 while m2b(b0) is a minimum value in the rule 2.

A fuzzy set of the conclusion portion of each of the rules is limited using a minimum value among membership values found out for each of the rules. In the rule 1, the membership function m1x(x) of the conclusion portion is cut away by m1a(a0), and in the rule 2, the membership function m2x(x) of the conclusion portion is cut away by the minimum value m2b(b0). The remaining portions of the membership functions at the conclusion portions (indicated by hatched areas in FIG. 1) are denoted by m1x'(x) and m2x'(x), respectively.

Subsequently, in order to compare membership values corresponding to output values x of the conclusion portions for the rules to obtain a maximum value between them to form a new membership function, the membership functions m1x'(x) and m2x'(x) are ORed. Such calculation to determine a maximum value is called a MAX operation. A function obtained by such OR operation is assumed as a membership function mx(x) with respect to the output variable x.

Generally, a value x0 of the center of gravity of the membership function mx(x) is calculated according to the relation of $$x0 = \frac{\int x \cdot mx(x)dx}{\int mx(x)dx},$$

, and the value x0 of the center of gravity is used as a final output value for the output x, that is, as a result of the inference. The foregoing is the most popular method of fuzzy inference.

Fuzzy inference can be executed by a series of calculations including (1) a calculation of membership values, (2) a calculation of minimum values (MIN operation), (3) a calculation of a maximum value (MAX operation) and (4) a calculation of the center of gravity. When such fuzzy inference is to be executed by software, it is necessary to execute calculations for each of rules. More specifically, a calculation of membership values and a MIN operation are executed for each rule. After such calculations are executed for all of the rules, a MAX operation must be executed for all of the final results. Consequently, in fuzzy inference depending upon software, the processing speed is decreased in proportion to the number of rules.

Various fuzzy inference executing devices on hardware have been proposed in which different rules are processed in a parallel relationship in order to increase the processing speed.

FIG. 2 shows an example of construction of a conventional semiconductor chip which executes fuzzy inference disclosed, for example, in Nikkei Electronics, No. 426, Jul. 27, 1987, P. 150. The fuzzy inference chip shown in FIG. 2 can realize a fuzzy inference system for 16 rules, 4 input variables (at a maximum) and 2 output variables (at a maximum). Input variables and output variables normally are fuzzy sets.

Referring to FIG. 2, the fuzzy inference chip includes four memories 2-1, 2-2, 2-3 and 2-4 for storing therein membership functions for 16 rules with respect to respective input variables a, b, c and d which are received by way of input signal lines 1-1, 1-2, 1-3 and 1-4, respectively. Each of the input signal lines 1-1 to 1-4 has a width of 4 bits.

The conventional fuzzy inference chip further includes 16 minimum (min) operation circuits 103-1 to 103-16 each of which receives membership values of corresponding rules from the memories 2-1 to 2-4 and determines a minimum one of the membership values in order to find out a minimum membership value for each of the 16 rules.

The fuzzy inference chip further includes, in order to provide a construction of a conclusion portion of fuzzy inference, a memory 4 in which membership functions for 16 individual rules with respect to an output variable x are stored, another memory 5 in which membership functions for the 16 individual rules with respect to another output variable y are stored, and comparator circuits 6-1 to 6-16 and 7-1 to 7-16 for cutting away membership functions for 16 rules with respect to each of the output variables x and y, with minimum membership values for the individual rules. The comparator circuits 6-1 to 6-16 receive and compare respective outputs of the min operation circuits 103-1 to 103-16 with corresponding outputs of the memory 4. The other comparator circuits 7-1 to 7-16 compare respective outputs of the memory 5 and corresponding outputs of the min operation circuits 103-1 to 103-16.

The conventional fuzzy inference chip further includes a max operation circuit 8 for receiving outputs of the comparator circuits 6-1 to 6-16 and determining a maximum value among them, another max operation circuit 9 for receiving outputs of the comparator circuits 7-1 to 7-16 and determining a maximum value among them, a gravity center calculating circuit 10 for calculating the center of gravity of a membership function for the output x from an output of the max operation circuit 8, and another gravity center calculating circuit 11 for determining the center of gravity of a membership function for the output y from an output of the max calculating circuit 9. An output of the gravity center calculating 10 is transmitted by way of an output signal line 12 having a width of 6 bits and provides an inference result x0 with respect to the output variable x. An output of the other gravity center calculating circuit 11 is transmitted by way of another output signal line 13 having a width of 6 bits and provides an inference result y0 with respect to the output variable y. Operation of the conventional fuzzy inference chip will be described subsequently, with reference to FIG. 3 which is an operation flow diagram of the fuzzy chip.

Each of the memories 2-1 to 2-4 has membership functions stored therein which represent fuzzy sets for the 16 rules with respect to a corresponding one of the input variables a to d. Similarly, the memories 4 and 5 have membership functions stored therein which represent fuzzy sets for the 16 rules with respect to the output variables x and y, respectively. Each of the memories 2-1 to 2-4 has addresses designated by one of either an input variable or output variable of 4 bits and stores a corresponding binary membership value of 4 bits in each address thereof. Accordingly, each of the input variables, output variables and membership values is processed with a degree of accuracy of 16 levels (4 bits).

If input values (a, b, c, d) are given in this condition, then the fuzzy inference chip executes inference. For example, if input data, a, of 4 bits are provided to the memory 2-1 by way of the input signal line 1-1, then the memory 2-1 outputs 16 data each of 4 bits representative of each of 16 membership values for the 16 rules. The 16 data of 4 bits from the memory 2-1 are individually provided to the min operation circuits 103-1 to 103-16 provided correspondingly for the 16 individual rules. Similarly, input values b, c and d are provided to the memories 2-2 to 2-4 by way of the input signal lines 1-2 to 1-4, respectively, and 16 membership values are outputted from each of the memories 1-2 to 1-4 and provided to the min operation circuits 103-1 to 103-16 (step S1).

Each of the min operation circuits 103-1 to 103-16 determines a minimum value among the four 4-bit data representative of four membership values received from the memories 2-1 to 2-4. Consequently, a minimum membership value for each of the 16 rules is determined. Outputs of the individual min operation circuits 103-1 to 103-16 are transmitted to corresponding ones of the comparator circuits 6-1 to 6-16 and 7-1 to 7-16 provided for the individual rules (step S2).

Memories 4 and 5 have membership values for outputs xi and yi read out sequentially to be supplied to the circuits 6-1 to 6-16 and 7-1 to 7-16 (step S3).

Each of the comparator circuits 6-1 to 6-16 compares a membership value from a corresponding one of the min operation circuits with a corresponding membership value from the memory 4 and passes a smaller one of the two membership values therethrough so that it may be supplied to the max operation circuit 8. Similarly, each of the comparator circuits 7-1 to 7-16 compares a membership value from a corresponding one of the min operation circuits and a corresponding membership value from the memory 5 and passes a smaller one of the two membership values so that it may be supplied to the max operation circuit 9 (step S4). The processing operations correspond to the operations of determining the hatched areas of the membership functions of the conclusion portions in FIG. 1.

The max operation circuits 8 and 9 determine, for the output variable x and y, a maximum value among membership values from the comparator circuits 6-1 to 6-16 and 7-1 to 7-16 corresponding to the 16 individual rules and transmit the thus determined maximum value to the gravity center calculating circuit 10 and 11, respectively (step S5). This processing operations correspond to the operations of ORing of the cut out membership functions of the conclusion portions in FIG. 1.

The gravity center calculating circuits 10 (or 11) determines the center of gravity for the output variable x (or y) from maximum values supplied thereto for the output variable x (or y) according to the relation $$x0 = \frac{\Sigma x_i m x(x_i)}{\Sigma m x(x_i)},$$

, where mx(xi) is the output of the max operation circuit 8 for the output xi, and outputs the thus determined center of gravity as a result x0 (or y0) of the inference by way of the signal line 12 (or 13) (step S6).

Since the conventional fuzzy inference chip described above can process different rules in a parallel relationship, it can execute fuzzy inference at a higher speed than in software processing. However, in order for such conventional fuzzy inference chip to execute a MIN operation, a MAX operation and an operation for cutting away a membership function for an output variable in a conclusion portion with a minimum membership value, it is necessary for the fuzzy inference chip to make a comparison in magnitude between membership values represented in binary numbers (binary digital values of a 4-bit notation in the example shown in FIG. 1). Since such comparison in magnitude must necessarily proceed successively for individual bits of membership values beginning with the most significant bit, there is a problem in that it is difficult to make such comparison at a high speed.

Further, with the conventional fuzzy inference chip, since hardware is provided fixedly on a semiconductor chip, the number of rules, the number of input variables, the number of output variables and so on are limited by the limitation on hardware, and there is another problem in that the degree of freedom in inference is very low.

Besides, since the conventional fuzzy inference chip is required to include minimum operation circuits and comparator circuits for individual rules, there is a further problem that the configuration of the device is great in size and complicated.

General review and practical applications of fuzzy inference chips are disclosed in Nikkei Electronics, No. 453, Oct. 3, 1988, pp. 157 to 168.

SUMMARY OF THE INVENTION

It is an object of the present invention to provide an improved semiconductor device for fuzzy inference which eliminates the problems of such conventional semiconductor devices for fuzzy inference described above.

It is another object of the present invention to provide a semiconductor device for fuzzy inference which can execute fuzzy inference at a high speed with a simple circuit construction.

It is a further object of the present invention to provide a semiconductor device for fuzzy inference which can make a comparison in magnitude of membership values at a high speed.

It is a still further object of the present invention to provide a semiconductor device which can execute fuzzy inference at a high speed and has an increased degree of freedom in fuzzy inference.

It is a yet further object of the present invention to provide a semiconductor device which can make a comparison in magnitude of output values of a plurality of functions at a high speed with a simple construction.

It is a yet further object of the present invention to provide a method for executing fuzzy inference at a high speed.

It is an additional object of the present invention to provide an operation method for making a comparison in magnitude at a high speed.

A semiconductor device for executing fuzzy inference according to the present invention is characterized in that a plurality of membership functions each indicative of a fuzzy set in fuzzy inference are stored in a memory array such that they are individually developed in a bit mapping, and a maximum value or a minimum value of the membership values is determined in accordance with a physical positional relationship of the membership values in the memory array.

In accordance with the present invention, an operation method for a semiconductor device for executing fuzzy inference which includes a first memory area for storing therein a relationship of a first input and a first output such that the relationship is developed in a bit mapping and a second memory area for storing therein a relationship of a second input and a second output such that the relationship is developed in a bit mapping comprises the steps of providing a first input and a second input to the first and second memory areas, respectively, reading out a first output corresponding to the first input and a second output corresponding to the second input from the first and second memory areas, respectively, and determining a relationship in magnitude of the first and second outputs in accordance with a physical positional relationship of the first and second outputs thus read out.

More specifically, a semiconductor device for executing fuzzy inference in accordance with the present invention at least comprises a first memory area for storing therein first input data and first output data determined as a first function of the first input data such that the first input data and the first output data are developed in a bit mapping using the first input data and the first output data as X addresses and Y addresses, respectively, a second memory area for storing therein second input data and second output data determined as a second function of the second input data such that the second input data and the second output data are developed in a bit mapping using the second input data and the second output data as X addresses and Y addresses, respectively, and means provided commonly for the Y addresses of the first and second memory arrays for making a comparison in magnitude of the first and second output data in accordance with output values of the Y addresses of the first and second memory areas.

The first and second functions are membership functions representative of a fuzzy set in fuzzy inference, and the first and second output data individually indicate membership values.

Meanwhile, an operation method in accordance with the present invention, in a semiconductor device which includes a first storage area for storing therein a relationship of a first input and a first output such that the relationship is developed in a bit mapping using the first input and the first output as X addresses and Y addresses, respectively, and a second storage area for storing therein a relationship of a second input and a second output such that the relationship is developed in a bit mapping using the second input and the second output as X addresses and Y addresses, respectively, comprises the steps of supplying a first input and a second input to the first and second memory areas, respectively, reading out all of data at an X address corresponding to the first input and the second input in a parallel relationship from the first and second memory areas, and determining a relationship in magnitude of a first output corresponding to the first input and a second output corresponding to the second input in accordance with a physical positional relationship of the data thus read out in a parallel relationship.

According to the present invention, the first and second output data which are, for example, membership values are stored on the memory cell array such that they are developed in a bit mapping, and the first and second output data are read out simultaneously in response to the first and second input data. Since a relationship in magnitude of the first and second output data is determined depending upon a relationship in magnitude of Y addresses corresponding to the first and second output data, it is not necessary to successively compare corresponding bits of output data, different from the case in a conventional construction wherein output data are given in a binary notation. Consequently, a comparison in magnitude can be made at a high speed, and besides, a circuit required for such comparison in magnitude can be eliminated. Accordingly, circuit construction can be simplified remarkably.

Further, in a semiconductor device for the execution of fuzzy inference, any of a min operation circuit, a comparator circuit and a max operation circuit need not be provided for each rule, but only it is necessary to store a membership function in a memory array such that it is developed in a bit mapping. Accordingly, only if a sufficient memory capacity is prepared, the number of rules can be increased readily. Further, if a construction is employed wherein an input variable and an output variable individually use multiplexingly an X address, then the degree of freedom in inference can be improved remarkably without complicating the construction or increasing the scale of the device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram schematically showing an entire construction of a semiconductor device for fuzzy inference according to an embodiment of the present invention;

FIG. 7 is a block diagram schematically showing a major part of a semiconductor device according to another embodiment of the present invention;

DESCRIPTION OF THE PREFERRED EMBODIMENTS

Figure 1:
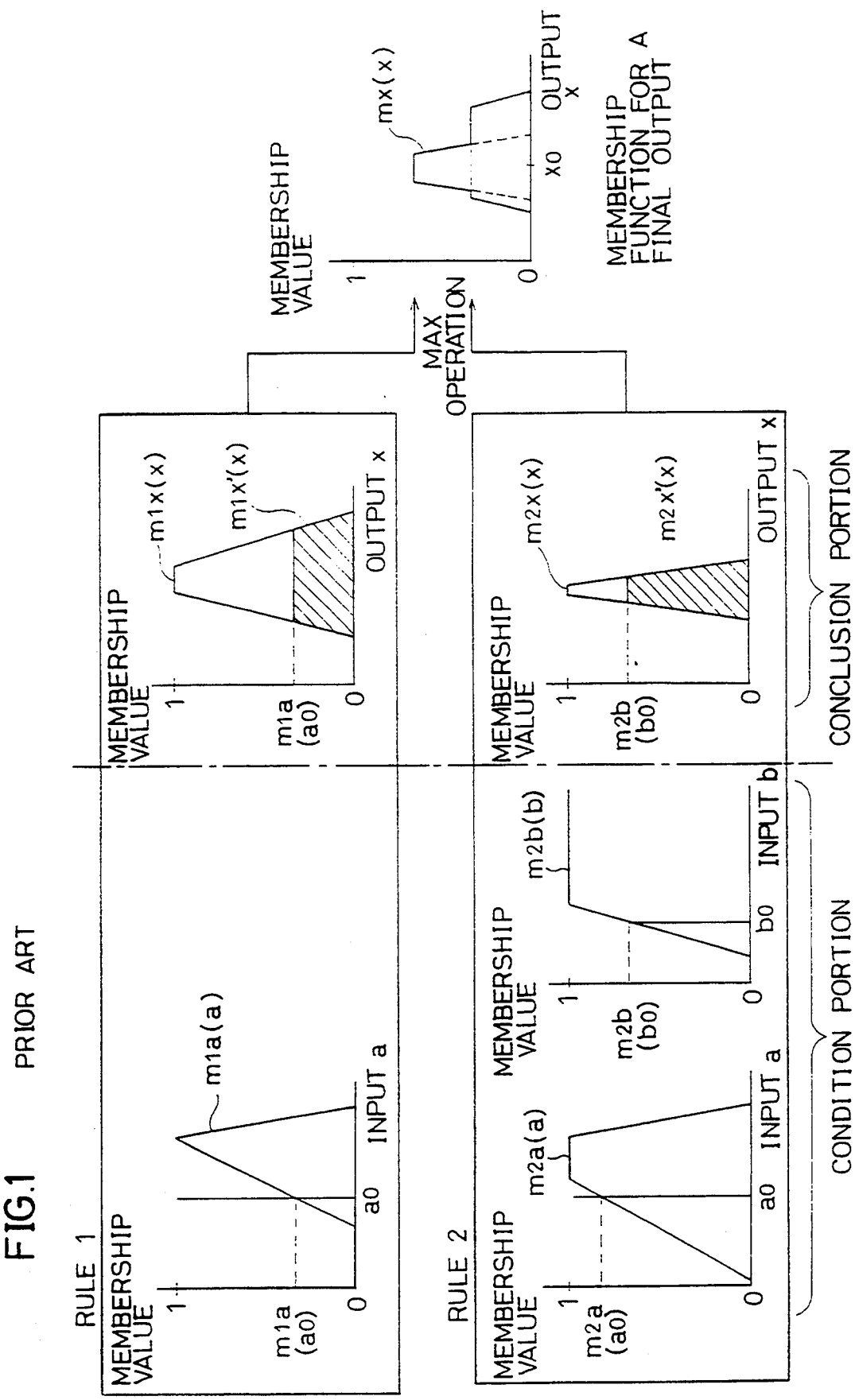
FIG. 1 is a diagrammatic representation illustrating a method of fuzzy inference.
Figure 2:
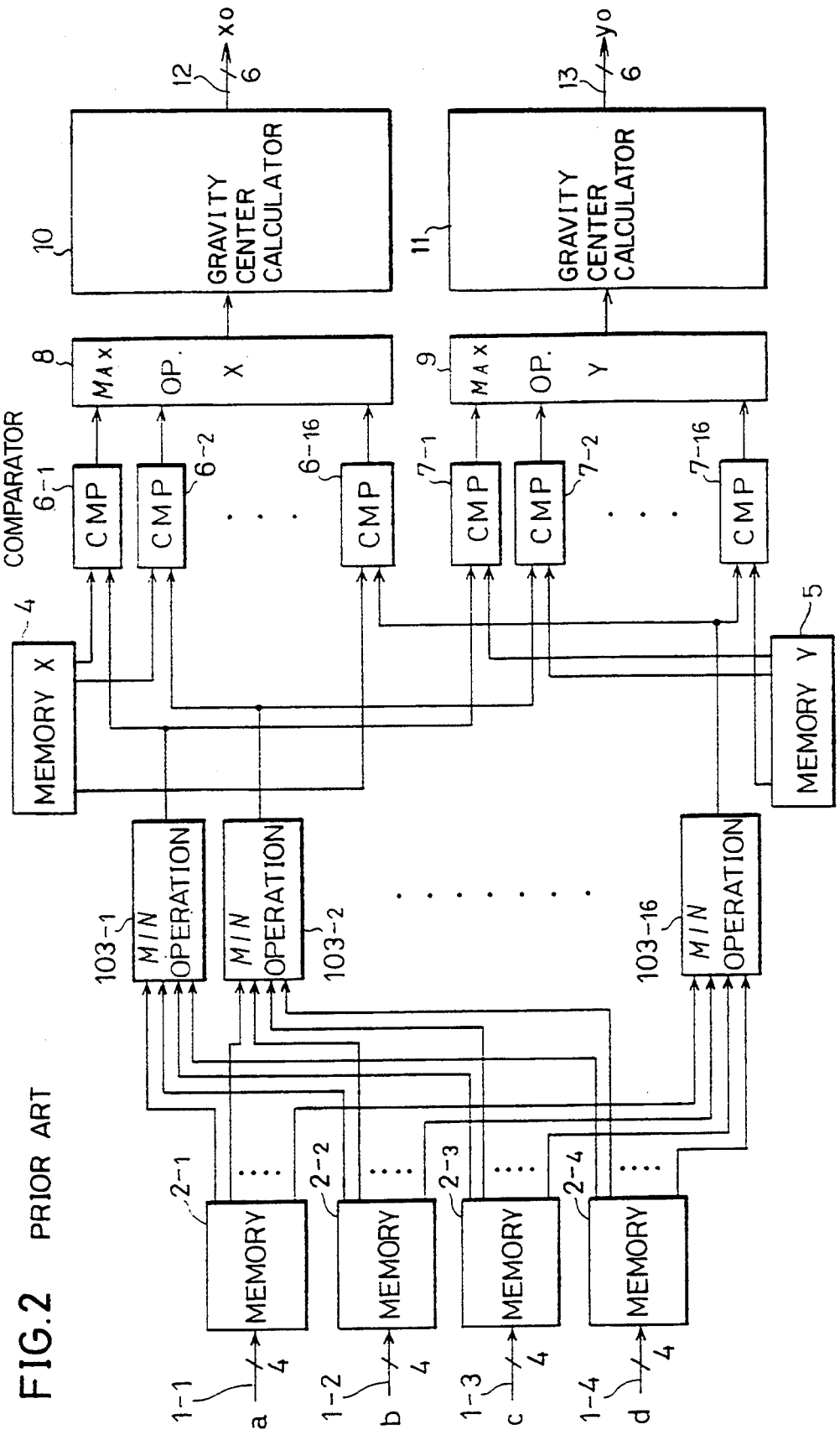
FIG. 2 is a block diagram schematically showing an entire construction of a conventional semiconductor device for the fuzzy inference.
Figure 3:
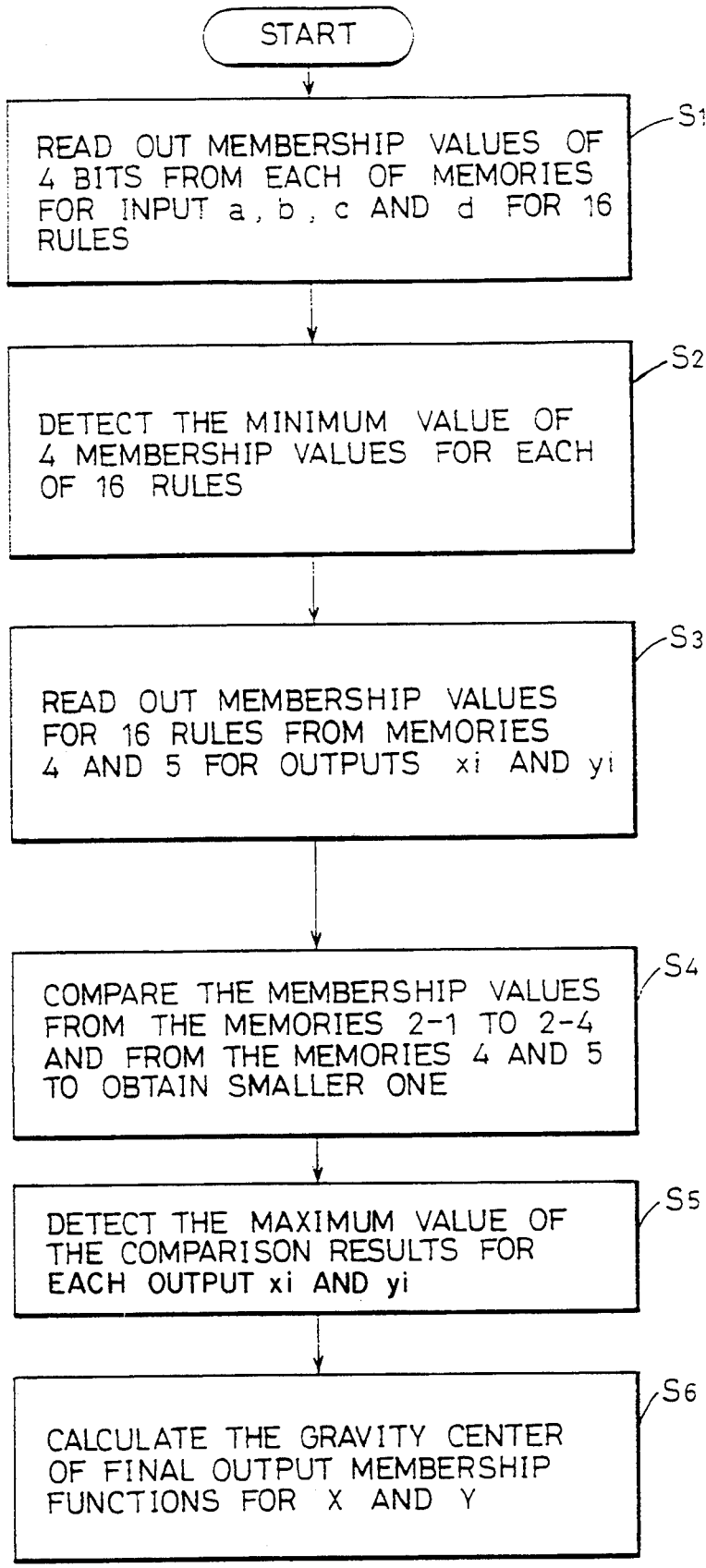
FIG. 3 is an operation flow diagram of the fuzzy chip shown in FIG. 2.

FIG. 4 is a block diagram schematically showing an entire construction of a semiconductor device for fuzzy inference according to an embodiment of the present invention. The semiconductor device shown in FIG. 4 can execute fuzzy inference including 2 rules, 1 input and 1 output.

Referring to FIG. 4, the semiconductor device for fuzzy inference includes a memory cell array 21 for storing membership functions for the condition portion (input variable) such that they are developed in a bit mapping, and a memory array 22 for storing different membership functions for the conclusion portion (output variable) such that they are developed in a bit mapping. The memory array 21 has 16 columns to which column addresses 23-0 to 23-15 are allotted. Odd-numbered ones of the columns 23-0 to 23-15 store membership functions for the first rule such that they are developed in a bit mapping while the even-numbered columns store membership functions for the second rule such that they are developed in a bit mapping. Similarly, the other memory array 22 has 16 columns designated by column addresses 24-0 to 24-15. Also in the memory array 22, odd-numbered ones and even-numbered ones of the columns 24-0 to 24-15 store therein membership functions for different rules such that they are developed in a bit mapping. Memory array 21 is provided with an X decoder 27 which decodes an input variable, a, received by way of an input signal line 29 to select a corresponding one of the columns of the memory array 21 while the memory array 22 is provided with an X decoder 28 which decodes an output variable x received by way of a signal line 30 to select a corresponding one of the columns of the memory array 22.

In order to make a comparison in magnitude on membership values for the input variable, a, and the output variable x, AND circuits 25-0 to 25-15 and a multiple selecting and separating encoder 26 are provided. The AND circuits 25-0 to 25-15 are disposed commonly for the corresponding columns of the memory arrays 21 and 22 while the multiple selecting and separating encoder 26 receives outputs of the AND circuits 25-0 to 25-15 and outputs a column address of a column having a maximum address among the columns from which signals of the logical value "1" are received. Each of the AND circuits 25-0 to 25-15 receives output values of corresponding ones of the columns of the memory arrays 21 and 22 and outputs the logical AND of the received values. For example, the AND circuit 25-0 outputs the logical AND of an output value of the column 23-0 and output value of the column 24-0. The multiple selecting and separating encoder 26 outputs a Y address (column address) value corresponding to a finally obtained output membership value by way of a signal line 31. When the outputs of the AND circuits 25-0 to 25-15 all present the logical value "0", the encoder 26 outputs a non-selection signal of the logical value "1" by way of a signal line 32.

The semiconductor device further includes a decoder circuit 33 for determining an output membership value in accordance with an output signal of the multiple selecting and separating encoder 26, and a gravity center calculating circuit 34 for calculating the center of gravity in accordance with an output of the decoder circuit 33 and outputting a result xg of the inference.

Subsequently, operation of the semiconductor device will be described.

Figure 5A:
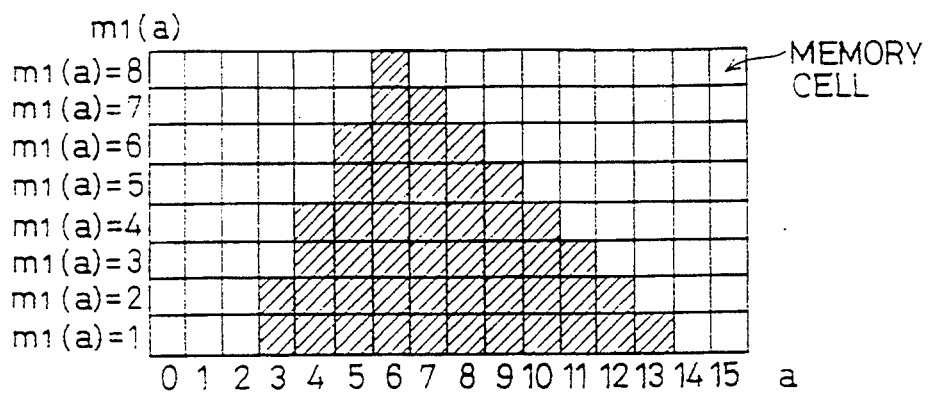
FIGS. 5A, 5B and 5C are illustrations showing an example of a memory array in which membership functions are stored.
Figure 5B:
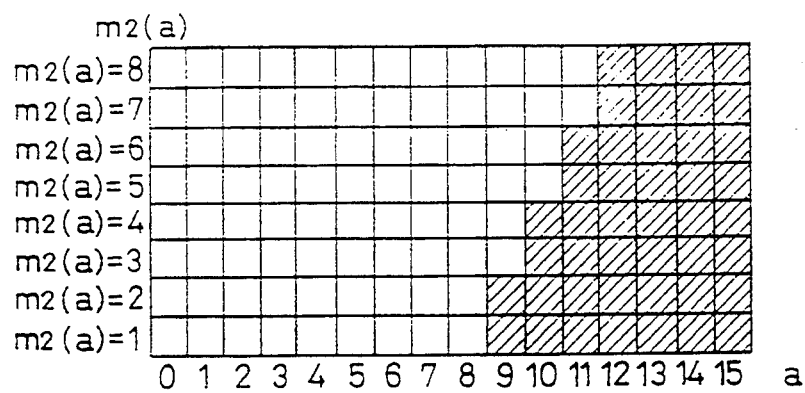
Figure 5C:
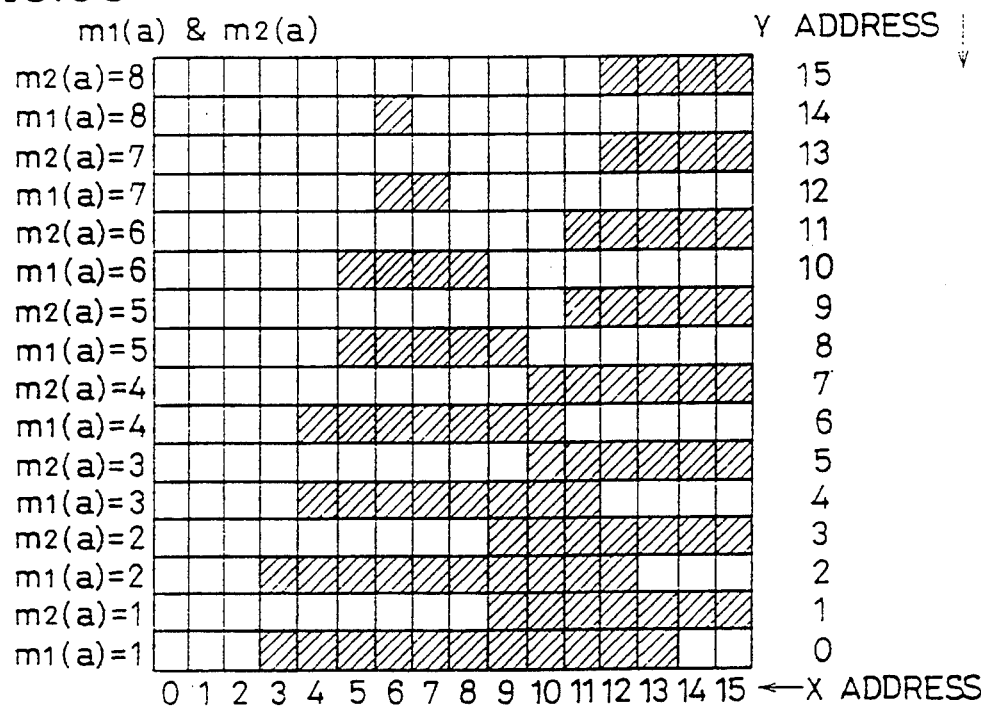

The memory array 21 has membership functions for the condition portion stored such that they are developed in a bit mapping. An example of stored contents of the memory array 21 is illustrated in FIGS. 5A to 5C. FIG. 5A illustrates a membership function m1(a) for the input variable, a, for the condition portion of the rule 1 while FIG. 5B illustrates another membership function m2(a) for the input variable, a, for the condition portion of the rule 2. The input variable, a, is divided into 16 segments and is thus represented in a 4-bit notation. A membership value is divided into 8 segments and is represented by 3 bits. A manner in which the membership functions illustrated in FIGS. 5A and 5B are stored on the memory array 21 such that they are developed in a bit mapping is shown in FIG. 5C. In FIG. 5C, a value of the input value a is taken as an X address, and the membership values m1(a) and m2(a) are stored alternately in each column of the memory array 21. Here, hatched areas in FIGS. 5A, 5B and 5C represent that the corresponding memory cells store the logical value "1" therein. In the stored contents shown in FIG. 5C, the membership function m1(a) for the rule 1 is stored in the even-numbered column addresses of the memory array 21 while the membership function m2(a) for the rule 2 is stored in the odd-numbered column addresses. For example, membership values m1(a)=1 and m2(a)=1 are stored in the Y addresses 0 and 1, respectively, and membership values m1(a)=2 and m2(a)=2 are stored in the Y addresses 2 and 3, respectively. It should be noted that maximum values of the membership values m1(a) and m2(a) are not normalized to "1" but set to "8".

Also in the memory array 22 shown in FIG. 4, membership functions for the rules 1 and 2 for the conclusion portion are stored such that they are developed in a bit mapping as illustrated in FIGS. 5A to 5C. Such membership functions are stored in order to develop a bit mapping wherein the output variable x represents an X address while a corresponding membership value corresponds to a Y address.

Figure 6A:
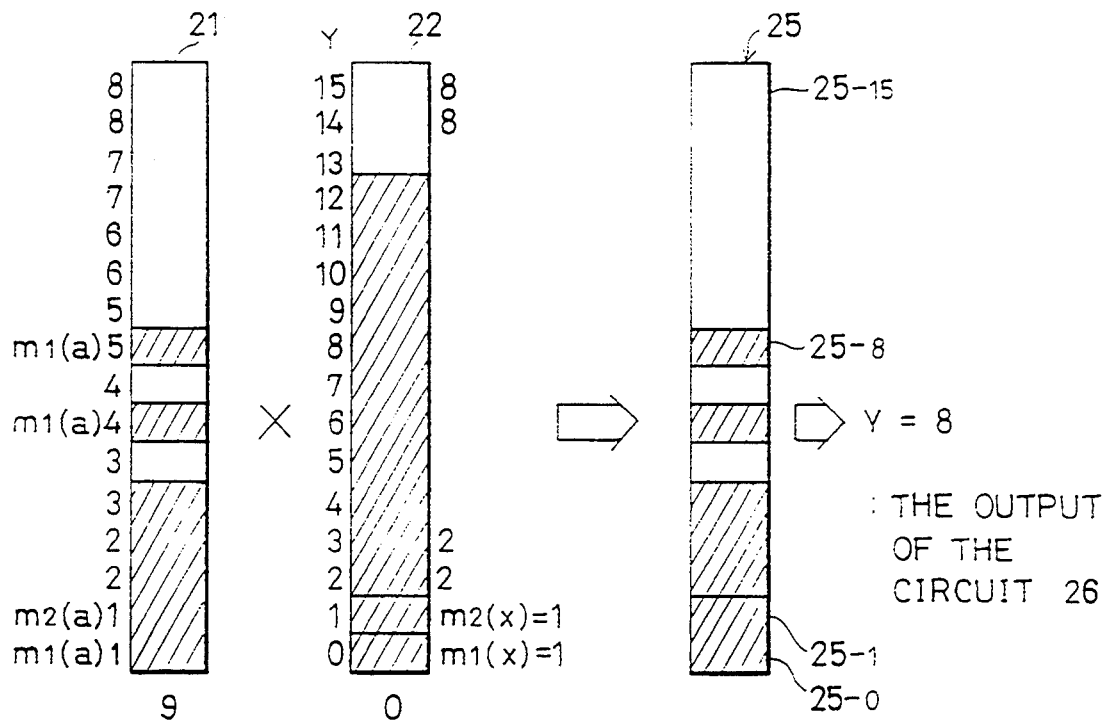
FIGS. 6A and 6B illustrate the operational manner of the semiconductor device shown in FIG. 4.
Figure 6B:
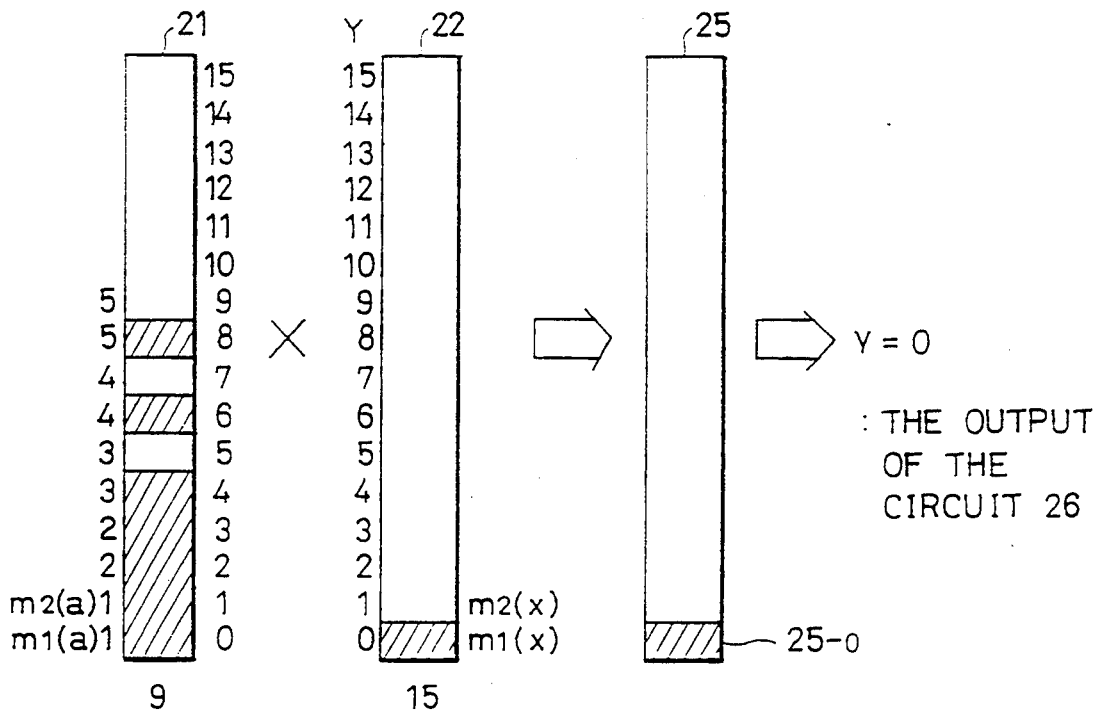

FIGS. 6A and 6B illustrate the operational manner of the device shown in FIG. 4. Operation is described with reference to FIGS. 4 through 6B.

Now, it is assumed that an input variable a9 corresponding to the X address "9" of the memory array 21 is given to the membership function for the condition portion. In this instance, from FIG. 5C, in a case that the X address is "9", data of the logical value "1" are outputted on rows corresponding to the membership values m1(a9)=1 to 5 and m2(a9)=1 to 2 in response to selection of the column by the X decoder 27. More specifically, signals of the logical value "1" are outputted on rows of the memory cell array 21 whose Y addresses are 0, 1, 2, 3, 4, 6 and 8. Data of memory cells of the memory array 21 on the column which has the X address of "9" are transmitted to one input of each of the AND circuits 25-0 to 25-15.

Subsequently, in this condition, an output variable x0 for setting to "0" the X address of the memory array 22 for the membership function for the conclusion portion is transmitted to the X decoder 28 by way of the signal line 30. The X decoder 28 selects one of the columns of the memory array 22 which is designated by the X address of "0". Consequently, data of memory cells of the memory array 22 on the column which has the X address of "0" are transmitted to the rows 24-0 to 24-15 and then transmitted to the other inputs of the AND circuits 25-0 to 25-15.

Accordingly, a signal potential of the logical value "1" is transmitted to only the rows to which the memory cells in the memory array 22 on the column having the X address of "0" and storing "1" are connected, and then to the other inputs of corresponding AND circuits 25-0 to 25-15 which are connected to those rows receiving the data of "1". Accordingly, in this instance, only the AND circuits to which the logical value "1" is transmitted from the associated rows of both of the memory arrays 21 and 22 output the logical value "1".

Outputs of the AND circuits 25-0 to 25-15 are transmitted to the multiple selecting and separating encoder 26. The multiple selecting and separating encoder outputs, on the signal line 31, a Y address value of a row which has a maximum value in row address among the rows to which the logical value "1" is transmitted as an input signal from corresponding AND circuits 25-0 to 25-15, that is, a Y address value of a row shown at the highest location in FIG. 4 among the rows associated with those, among the AND circuits 25-0 to 25-15, outputting the logical value "1". In FIG. 6A, the Y address Y0 is shown as 8.

Subsequently, while the value of the input variable to the memory array 21 for the condition portion is fixed to a9, the value of the output variable to the memory array 22 for the conclusion portion is changed from x0 to x1. Consequently, a row address value of a row having a maximum address value among the rows associated with the AND circuits which output the logical value "1" for the output variable value x1, is outputted onto the signal line 31 by way of the multiple selecting and separating encoder 26. Such operation is repeated from x0 to x15 of the output variable value while the input variable value a9 is kept fixed. Consequently, Y address values corresponding to the respective output variable values x0 to x15 when the input variable value is a9 are successively outputted from the multiple selecting and separating encoder 26 by way of the signal line 31 (see FIG. 6B). In FIG. 6B, that Y address Y15 for x=15 is shown as 0.

It is assumed that address values obtained by such operation as described above are Y0 to Y15 corresponding to the output variable values x0 to X15. A membership function mx(x) with respect to the output variable x is calculated based on the address values Y0 to Y15 by the decoder circuit 33. Thus, a MAX calculation can be executed readily. For example, if the address values transmitted over the signal line 31 are Y0=8, Y1=7, Y2=6, ..., then the membership functions corresponding to them are, from FIG. 5C, mx(x0)=5, mx(X1)=4, mx(x2)=4, respectively.

In the construction shown in FIG. 4, since the membership function for the rule 1 and the membership function for the rule 2 are disposed alternately in the Y address direction (in the direction along a column), when the Y address is an odd number, a relationship $$Y_n = 2 \cdot mx(x_n) - 1$$

is obtained, but when the Y address is an even number, another relationship $$Y_n = 2 \cdot mx(x_n) - 2$$

is obtained. Accordingly, a membership function mx(x) with respect to the output variable x after MAX operation processing can be determined by executing a calculation of either one of the expressions depending upon whether the value Yn of the Y address is an even number or an odd number (this can be determined readily by detecting "0" or "1" of the least significant bit of the Y address). Such processing of determining a membership value (function) mx(x) from a Y address is executed by the decoder circuit 33. An output of the decoder circuit 33 is transmitted to the gravity center calculating circuit 34 at which a calculation of the center of gravity for the membership function mx(x) is executed, and a result xg of the inference is outputted from the gravity center calculating circuit 34, according to the relation of $$\frac{\sum_{i=0}^{15} xi \cdot mx(xi)}{\sum_{i=0}^{15} \cdot mx(xi)}.$$

In a case that a non-selection signal is produced from the multiple selecting and separating circuit 26 onto the signal line 32 so that the signal potential on the signal line 32 is changed to the logical level "1", all of the outputs of the AND circuits 25-0 to 25-15 output the logical value "0", and the membership function mx(x1) with respect to the output variable value xi is "0".

By the operation described above, a membership function of a final output with respect to the arbitrary input variable value a9 can be obtained for the fuzzy inference illustrated in FIG. 1.

The decoder 33 can be constructed readily. In particular, since the expressions given hereinabove involve processing of dividing an output Yn of the multiple selecting and separating encoder 26 by "2", in a case that such Y address Yn is provided in binary notation, "1" (01) or "2" (10) is added to Yn depending upon whether Yn is an even number or an odd number, and then the value obtained by such addition is outputted after it is shifted by one bit to the least significant bit.

In the structure shown in FIG. 4, the input variable a is maintained at a9 while the output variable x is successively changed from x0 through x15. This structure can be readily implemented. For example, the input a is supplied through a latching circuit for latching an applied input variable to the decoder 27. The output variable x is generated by a four-bit counter. The latching circuit and the counter can be controlled by a clock signal from a controller externally or internally provided, and the operation timings thereof can be readily established.

It is to be noted again that, in the construction shown in FIG. 4, the number of input variables is 1 and the number of membership functions for the condition portion with respect to an input variable is one for each rule. The construction can be expanded so that the number of input variables for the condition portion may be increased to 2.

FIG. 6 schematically shows an entire construction of a semiconductor device according to another embodiment of the present invention. The semiconductor device shown in FIG. 5 can execute fuzzy inference for 2 rules, 2 inputs and 1 output. In other words, the semiconductor device shown in FIG. 7 has a construction which can execute such fuzzy inference as illustrated in FIG. as it is.

Referring to FIG. 7, the semiconductor device includes a memory array 130 for storing therein a total of five membership functions including membership functions m1a(a) and m2a(a) for the condition portion with respect to an input variable, a, for a rule 1 and a rule 2, respectively, a membership function m2b(b) for the condition portion with respect to another input variable, b, for the rule 2 and membership functions m1x(x) and m2x(x) for the conclusion portion with respect to an output variable ,x, for the rules 1 and 2, respectively, such that they are all developed in a bit mapping. The memory array 130 has 40 rows represented by row addresses 3-0 to 3-39. Each five rows of the 40 rows make a set, and the membership functions m1a(a), m1x(x), m2a(a), m2b(b) and m2x(x) mentioned above are stored in this order in 5 rows of each set such that they are developed in a bit mapping. The storage form of the bit map is similar to that of FIGS. 5A to 5C, and membership functions corresponding to an X address are stored in the form of binary information in memory cells of the individual rows. Accordingly, the memory array 130 has a total of 8 sets each including 5 rows for storing 5 membership functions therein and corresponding to membership values 1, 2, 3, ... and 8 in this order from a smallest Y address (from the bottom in FIG. 7).

In order to select a column of the memory array 130, an X decoder 27 is provided for decoding an input variable ai or bj or an output variable x transmitted thereto by way of a signal line 39 to select a corresponding column. Now, if it is assumed that each of the input variable values ai, bj and output variable consists of 4 bit and the X decoder 27 is formed as a 4-bit decoder, the memory array 130 has memory cells disposed in 16 columns and 40 rows and each having a value (binary information) indicative of a membership function stored therein.

In order to make a comparison in magnitude of membership functions, 8 magnitude comparator circuits 150-1 to 150-8 are provided for the sets of rows. Each of the magnitude comparator/detector circuits 150-1 to 150-8 includes three tri-state buffers 45-1 to 45-3, three registers 46-1 to 46-3, two AND circuits 49-1 and 49-2, an OR circuit 47 and a further AND circuit 48. The tri-state buffer 45-1 is brought into a conducting state in response to a control signal $\phi1$ transmitted over a signal line 43 so that a signal potential on the row 3−(n+4) is transmitted to the register 46-1. The tri-state buffer 45-2 is brought into a conducting state in response to such control signal $\phi1$ on the signal line 43 so that data on the row 3−(n+2) is transmitted to the register 46-2. The tri-state buffer 45-3 is brought into a conducting state in response to a control signal $\phi2$ on a signal line 44 so that data on the row 3−(n+1) is transmitted to the register 46-3. The registers 46-1, 46-2 and 46-3 are activated, when the corresponding tri-state buffers are brought into a conducting state, to latch therein signal potentials transmitted thereto and thereafter output the latched data continuously.

The AND circuit 49-1 performs an AND operation on an output of the register 46-1 and an output of the row 3−(n+3). The AND circuit 49-2 performs an AND operation on the outputs of the registers 46-2 and 46-3 and a signal potential on the row 3−n. The OR circuit 47 provides a logical sum of outputs of the AND circuits 49-1 and 49-2. The AND circuit 48 is activated in response to a control signal $\phi3$ to allow an output of the OR circuit 47 to pass therethrough, and an output signal thereof is transmitted to a corresponding row of a multiple selecting and separating encoder 26′.

The multiple selecting and separating encoder 26' executes a similar operation to that of the multiple selecting and separating encoder 26 shown in FIG. 4, but is different only in that the number of input signals is reduced from 16 bits to 8 bits. The multiple selecting and separating encoder 26' transmits information representative of a maximum row address for rows which output the logical value "1". When the signal potentials on signal lines 38-1 to 38-8 all represent the logical value "0", the multiple selecting and separating encoder 26' generates a non-selection signal and transmits the same onto a signal line 32. Subsequently, operation of the semiconductor device will be described.

Now, it is assumed that ai is supplied as an input signal for the input variable, a, and bj is supplied as another input signal for the input variable b. In this instance, the value ai is transmitted as an input signal to the decoder circuit 27 over a signal line 39. The decoder circuit 27 decodes the input value ai and outputs "1" onto the column of the memory array 130 whose X address is "i" to put the column "i" into a selected state. Consequently, memory cells connected to the selected column i are connected to associated rows of the memory array 130 to transmit stored information thereof to the associated rows. As a result, the rows 3-0 to 3-39 of the memory array 30 individually present signal potentials of the logical value "0" or "1". The signal potential on each row is transmitted to an input terminal of the AND circuit 49-1 to 49-2 or tri-state buffer 45-1, 45-2 or 45-3 provided corresponding to the respective row.

Subsequently, the control signal $\phi1$ is put into an activated state of the logical value "1" and transmitted onto the signal line 43. Consequently, only signal outputs on the rows which store therein membership functions with respect to the input variable, a, are transmitted to the registers 46-1 and 46-2 by way of the tri-state buffers 45-1 and 45-2, and only membership functions m1a(a) and m2a(a) stored in the rows 3−(n+4) and 3−(n+2) are selectively latched into the registers 46-1 and 46-2.

In this instance, the control signal $\phi2$ remains in a non-activated state, and consequently, the tri-state buffers 45-3 remain in a non-activated state so that the membership function m2b(b) with respect to the input variable, b, is not yet transmitted. Accordingly, the logical value "0" or "1" of outputs of all of the rows with respect to the input variable, a, are latched by all of the registers 46-1 and 46-2 provided corresponding to the rows of the array in which the membership functions m1a(a) and m2a(a) for the input variable, a, are stored, respectively. Subsequently, the control signal $\phi1$ is put into a non-activated state to separate the memory array 130 from the magnitude comparing and detecting circuits 150 and put the memory array 130 into a standby state, to wait for the reception of another input variable bj. In this instance, the formerly latched data in the registers 46-1 and 46-2 are kept stored.

Subsequently, an input value bj is applied as an input variable, b, to the decoder circuit 27 by way of the input signal line 39. The decoder circuit 27 charges the signal potential on a column of the memory array 130 whose X address is "j" to the logical value "1" to put the column "j" into a selected state. Consequently, information of memory cells of the memory array 130 connected to the selected column "j" is transmitted onto the individual rows so that the signal potential on each of the rows 3-0 to 3-39 is set to the logical value "0" or "1". Subsequently, a control signal $\phi2$ is produced on the signal line (input b selecting line) 44 to set the signal potential to the logical value "1". Consequently, an output of the row 3−(n+1) which is the membership function m2b(b) with respect to the input variable, b, are latched by the register 46-3 by way of tri-state buffer 45-3. Tri-state buffer 45-3 is put into an activated state by the control signal $\phi2$. As a result, the logical value "0" or "1" of a signal potential on a row is written into and latched by the associated register 46-3 provided for the respective rows with respect to the input variable b. Subsequently, the control signal $\phi2$ is put into a non-activated state and the memory array 130 is placed back into a standby state again. As a result, logical values corresponding to membership functions with respect to the input variables a and b, are stored in the registers 46-1 to 46-3.

Subsequently, output values x0 to x15 are sequentially applied as an output variable x to the decoder circuit 27 by way of the input signal line 39. The decoder circuit 27 sets the signal potential on the rows of the X addresses 0 to 15 of the memory array 130 sequentially to "1" in response to such values x0 to x15 to successively put the individual columns into a selected state. Accordingly, output values of the rows which store the membership functions m1x(x) and m2x(x) of the memory array 130 with respect to the output variable x are transmitted to respective input terminals of the AND circuits 49-1 and 49-2. In this instance, the signal potentials on the signal line 43 for selecting the input variable, a, and the signal line 44 for selecting the input variable, b, are both at the logical value "0", and accordingly, all of the tri-state buffers 45-1 to 45-3 are in an off-state. In this condition, the individual registers 46-1 to 46-3 have stored therein information regarding the membership values m1a(ai), m2a(ai) and m2b(bj) for input values ai and bj.

The AND circuits 49-1 and 49-2 performs AND operations on output values regarding the membership values m1x(x) and m2x(x) with respect to the output variable x, respectively.

The AND circuit 49-1 sequentially outputs a membership function of the output variable x for the rule 1 for the output variable values from x0 to x15 while the AND circuit 49-2 sequentially outputs information regarding another membership function of the output variable x for the rule 2 for the output variable values from x0 to x15.

The OR circuit 47 performs an OR operation on outputs of the AND circuits 49-1 and 49-2. Subsequently, the control signal $\phi3$ is put into an activated state to bring the AND circuit 48 into an enable state in response to the establishment of the individual output variable values x0 to x15. Consequently, a result of comparison in magnitude of output variable values, that is, a result of a MAX operation conducted in accordance with the method illustrated in FIG. 1 is outputted from each of the AND circuits 48.

The output signal lines 38 are provided for each set consisting of 5 rows of the memory array 130 for one output variable value. In particular, the 8 output signal lines 38-1 to 38-8 are provided for the 40 rows of the entire memory array 130, and the signal potentials on the output signal lines 38-1 to 38-8 correspond respectively to the membership values mx(x) = 1 to 8 from the minimum value in the Y address direction.

The signal potentials on the 8 output signal lines 38-1 to 38-8 are transmitted to the multiple selecting and separating encoder 26'. The multiple selecting and separating encoder 26' transmits, as 3-bit data onto the signal line 31, address information indicative of a Y address of a signal line which has a maximum row address among those of the signal lines onto which the logical value "1" is transmitted. Consequently, a signal indicative of an address corresponding to a maximum of a plurality of membership values with respect to the output variable x is outputted from the multiple selecting and separating encoder 26'. In this instance, since the membership values range from 1 to 8 and also 8 multiple selecting and separating circuits 150 are provided, the output of the multiple selecting and separating encoder 26' provides the maximum membership value, and accordingly, the decoder circuit 33 shown in FIG. 4 can be omitted.

In the construction shown in FIG. 7, the AND circuits 49-1 and 49-2 are always kept in an enabled state. Accordingly, a certain signal potential may be transmitted by any of the AND circuits 49-1 and 49-2 irrespective of a selection condition of the memory array 130, which may possibly cause an erroneous operation of the circuit. In this instance, reliable MIN-MAX calculations can be achieved if the circuit is modified such that a control signal corresponding to the control signal $\phi 3$ is supplied to the AND circuits 49-1 and 49-2 so that the AND circuits 49-1 and 49-2 can be put into an enabled state after an output variable value x is supplied and a corresponding membership value is established. The clock signals $\phi 1$ to $\phi 3$ may either be generated internally or externally applied.

A membership function $mx(x)$ $\{mx(x) \mid x=x0, x1, x2, \ldots, x15\}$ of final outputs with respect to the output variable $\{x \div x = x0, x1, x2, \ldots, x15\}$ of final outputs with respect to the outcome variable $\{x \mid x=x0, x1, x2, \ldots, x15\}$ for the conclusion portion when the input value for the condition portion input variable, a, is ai and the input value for the condition portion input variable, b, is bj, can be obtained by the operation described above.

Figure 8:
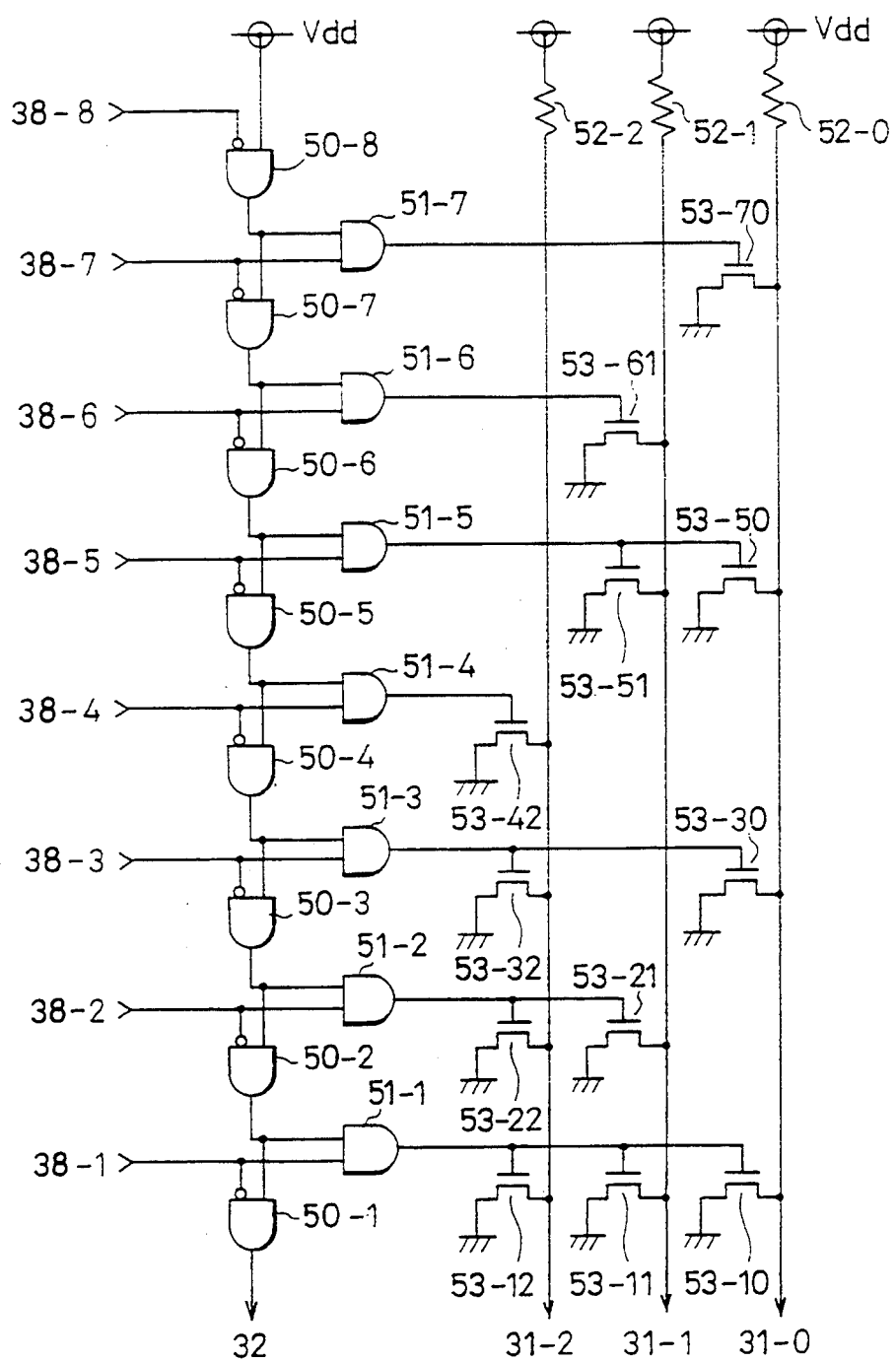
FIG. 8 is a block diagram showing an example of construction of a multiple selecting and separating encoder of the semiconductor device shown in FIG. 7.

FIG. 8 shows an example of the construction of a multiple selecting and separating encoder. The multiple selecting and separating encoder shown in FIG. 8 has a construction which outputs a signal indicative of a row having a maximum row address among 8 rows which output the logical value "1", and corresponds to the multiple selecting and separating encoder 26' shown in FIG. 7.

Referring to FIG. 8, the multiple selecting and separating encoder includes 8 logical gates 50-1 to 50-8 each constituted from an AND gate having two inputs one of which is a false input while the other input is a true input in order to produce a non-selection signal on the signal line 32. The logical gate 50-8 receives at the false input thereof a signal potential on the row 38-8 and receives at the true input thereof a reference potential Vdd which is, for example, a power source potential. The logical gate 50-7 receives at the false input thereof a signal potential on the row 38-7 and receives at the true input thereof an output of the logical gate 50-8. The logical gate 50-6 receives at the false input thereof a signal potential on the row 38-6 and receives at the true input thereof an output of the logical gate 50-7. The logical gate 50-5 receives at the false input thereof a signal potential on the row 38-5 and receives at the true input thereof an output of the logical gate 50-6. The logical gate 50-4 receives at the false input thereof a signal potential on the row 38-4 and receives at the true input thereof an output of the logical gate 50-5. The logical gate 50-3 receives at the false input thereof a signal potential on the row 38-3 and receives at the true input thereof an output of the logical gate 50-4. The logical gate 50-2 receives at the false input thereof a signal potential on the row 38-2 and receives at the true input thereof an output of the logical gate 50-3. The logical gate 50-1 receives at the false input thereof a signal potential on the row 38-1 and receives at the true input thereof an output of the logical gate 50-2. A non-selection signal is outputted from the logical gate 50-1 onto the signal line 32.

The multiple selecting and separating encoder further includes, in order to output a signal which designates a row having a maximum row address among the rows which output the logical value "1", 7 AND circuits 51-1 to 51-7 and 12 insulated gate field effect transistors 53-10 to 53-12, 53-21, 53-22, 53-30, 53-32, 53-42, 53-50, 53-51, 53-61 and 53-70. The AND circuit 51-1 receives a signal potential on the row 38-1 and an output of the logical gate 50-2. The AND gate 51-2 receives a signal potential on the row 38-2 and an output of the logical gate 50-3. The AND gate 51-3 receives a signal potential on the row 38-3 and an output of the logical gate 50-4. The AND gate 51-4 receives a signal potential on the row 38-4 and an output of the logical gate 50-5. The AND gate 51-5 receives a signal potential on the row 38-5 and an output of the logical gate 50-6. The AND gate 51-6 receives a signal potential on the row 38-6 and an output of the logical gate 50-7. The AND gate 51-7 receives a signal potential on the row 38-7 and an output of the logical gate 50-8.

The transistor 53-10 is put into a conducting state in response to a "1" output of the AND circuit 51-1 to connect the signal line 31-0 to a reference potential (hereinafter referred to as ground potential) representative of the logical value "0". The transistor 53-11 is put into a conducting state in response to a "1" output of the AND circuit 51-1 to connect the signal line 31-1 to the ground potential. The transistor 53-12 is put into a conducting state in response toya "1" output of the AND circuit 51-1 to connect the signal line 31-2 to the ground potential.

The transistor 53-21 is put into a conducting state in response to a "1" output of the AND circuit 51-2 to connect the signal line 31-1 to the ground potential. The transistor 53-22 is put into a conducting state in response to a "1" output of the AND circuit 51-2 to connect the signal line 31-2 to the ground potential. The transistors 53-30 and 53-32 are put into a conducting state in response to a "1" output of the AND circuit 51-3 to connect the signal lines 31-0 and 31-2 to the ground potential.

The transistor 53-42 is put into a conducting state in response to a "1" output of the AND circuit 51-4 to connect the signal line 31-2 to the ground potential. The transistors 53-50 and 53-51 are put into a conducting state in response to a "1" output of the AND circuit 51-5 to connect the signal lines 31-0 and 31-1 to the ground potential.

The transistor 53-61 is put into a conducting state in response to a "1" output of the AND circuit 51-6 to connect the signal line 31-1 to the ground potential. The transistor 53-70 is put into a conducting state in response to a "1" output of the AND circuit 51-7 to connect the signal line 31-0 to the ground potential.

Pull-up resistors 52-0, 52-1 and 52-2 are provided for the signal lines 31-0, 31-1 and 31-2, respectively. The pull-up resistors 52-0, 52-1 and 52-2 are connected at the other terminal thereof to reference potential $V_{DD}$ (for example, a power source potential) which provides the logical value "1". Subsequently, operation of the multiple selecting and separating encoder will be described.

Now, a case is examined wherein the logical value "1" is received from the rows 38-3 and 38-5 while the logical value "0" is received from the remaining rows. Since the logical value "0" is transmitted on the rows 38-6, 38-7 and 38-8, the logical gates 50-6, 50-7 and 50-8 all output the logical value "1". Accordingly, the logical value "1" is supplied to one of the two input terminals of each of the AND circuits 51-5, 51-6 and 51-7. Meanwhile, since the logical value "0" is transmitted from the rows 38-6 and 38-7, the logical value "0" is supplied to the other input terminals of the AND circuits 51-6 and 51-7. Consequently, the AND circuits 51-6 and 51-7 output the logical value "0".

Since the logical value "1" is transmitted from the row 38-5, the logical value "1" is supplied to the other input terminal of the AND circuit 51-5. Consequently, the AND circuit 51-5 outputs the logical value "1".

Since the two inputs of the logical gate 50-5 both receive a signal of the logical value "1", the logical gate 51-5 outputs the logical value "0". Consequently, the AND gate 50-1, 50-2, 50-3 and 50-4 all output the logical value "0". As a result, the AND circuits 51-1, 51-2, 51-3 and 51-4 all output the logical value "0".

Due to the functions of the logical gate described above, only the AND circuit 51-5 among the AND circuits 51-1 to 51-7 outputs the logical value "1". The transistors 53-50 and 53-51 receive the logical value "1" at the gates thereof so that they are put into a conducting state, and consequently, the potentials at the signal lines 31-0 and 31-1 are dropped to a potential level proximate the ground potential. Meanwhile, the signal line 31-2 is kept at a level of the power source potential Vdd by way of the pull-up resistor 52-2 because the transistors connected thereto all remain in a non-conducting state.

Consequently, the logical values "1", "0" and "0" are outputted onto the three signal lines 31-2, 31-1 and 31-0, respectively. In other words, a row address "100" is outputted. Thus, a signal indicative of a row having a maximum row address among the rows which output the logical value "1" can be obtained.

Meanwhile, the logical value "0" is outputted onto the signal line 32 by way of the logical gate 50-1.

As a result of such operation as described above, an address value of a row having a maximum row address value, that is, a row at the highest position in FIG. 8, among the rows on which the logical value "1" is transmitted, is outputted onto the signal lines 31-0 to 31-2. For example, in case the row having a maximum row address is the row 38-8, 3-bit data (1, 1, 1) are outputted to the signal lines 31-0 to 31-2. Similarly, when the row of the maximum row address is the row 38-7, 38-6, 38-5, 38-4, 38-3, 38-2 and 38-1, data (1, 1, 0), (1, 0, 1), (1, 0, 0), (0, 1, 1), (0, 1, 0), (0, 0, 1) and (0, 0, 0) is outputted, respectively. Meanwhile, when the logical value "0" is transmitted over all of the rows 38-1 to 38-8, the logical value "1" is outputted onto the signal line 32.

Since the multiple selecting and separating encoder operates in such a manner as described above, if the Y address is determined such that the Y address=7 for the row 38-8, the Y address=6 for the row 38-7, ... , and the Y address=0 for the row 38-1, then output values of 3 bits of the signal lines 31-2, 31-1 and 31-0 are equal to a value obtained by encoding into a binary number an address value of a row having a maximum address value among the rows which present the logical value "1". When the signal value "0" is supplied to all of the rows 38-1 to 38-8, the non-selection signal outputting signal line 32 outputs the logical value "1".

While the construction described above is constituted so as to encode an address of a row having a maximum address value among the 8 rows which output the logical value "1", it can be expanded readily to a case wherein there are a total of 16 rows as shown in FIG. 4 if transistors are disposed such that each row is represented by a binary notation of 4 bits.

Figure 9:
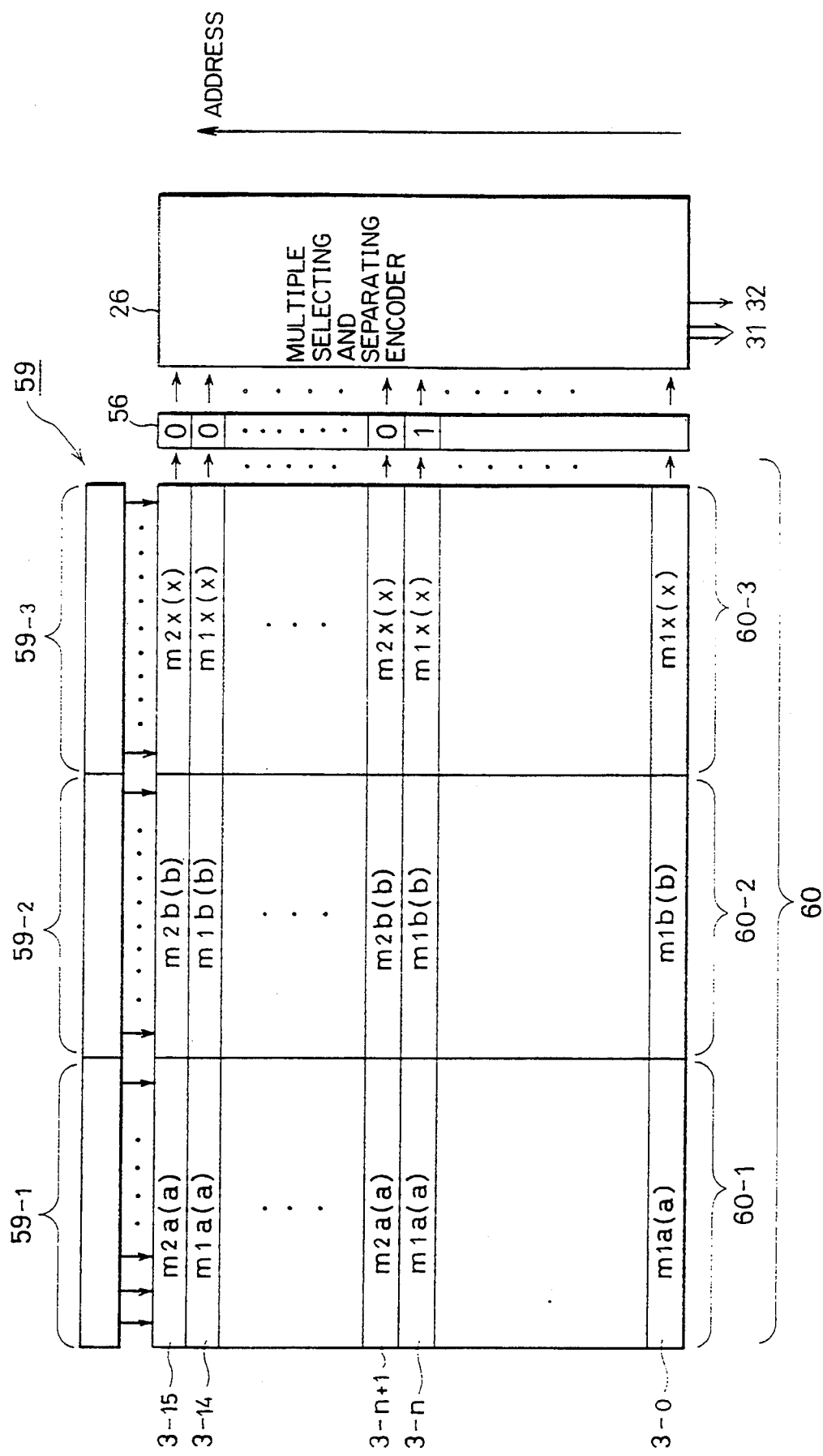
FIG. 9 is a block diagram schematically showing construction of a major part of a semiconductor device according to a further embodiment of the present invention.

FIG. 9 shows construction of a major part of a semiconductor device according to a further embodiment of the present invention. Referring to FIG. 9, a memory array 60 is formed from three CAM (content-addressable memory) sub-arrays (data field) including a CAM sub-array 60-1 for an input variable, a, another CAM sub-array 60-2 for another input variable, b, and a further CAM sub-array 60-3 for an output variable x. The CAM array 60 has 16 rows 3-0 to 3-15 each for storing a word therein. Membership values m1a(a), m1b(b) and m1x(x) for a rule 1 and membership value m2a(a), m2b(b) and m2x(x) for a rule 2 are stored in alternate rows 3-0 to 3-15 such that data fields correspond to each other in the array 60.

Three retrieval data deriving circuits 59-1, 59-2 and 59-3 are provided to derive retrieval data for the CAM sub-arrays 60-1, 60-2 and 60-3, respectively.

The semiconductor device further includes a register 56 for storing therein signals indicative of results of comparison or coincidence/non-coincidence between retrieval data and words of the individual rows of the CAM sub-arrays 60-1 to 60-3, and a multiple selecting and separating encoder 26 for outputting, in accordance with data stored in the register 56, a row address of a row having a maximum row address (an uppermost row in FIG. 9) among the rows which output the logical value "1" (those rows in which a retrieval word and a stored word coincide with each other). Subsequently, operation of the semiconductor device will be described.

Figure 10:
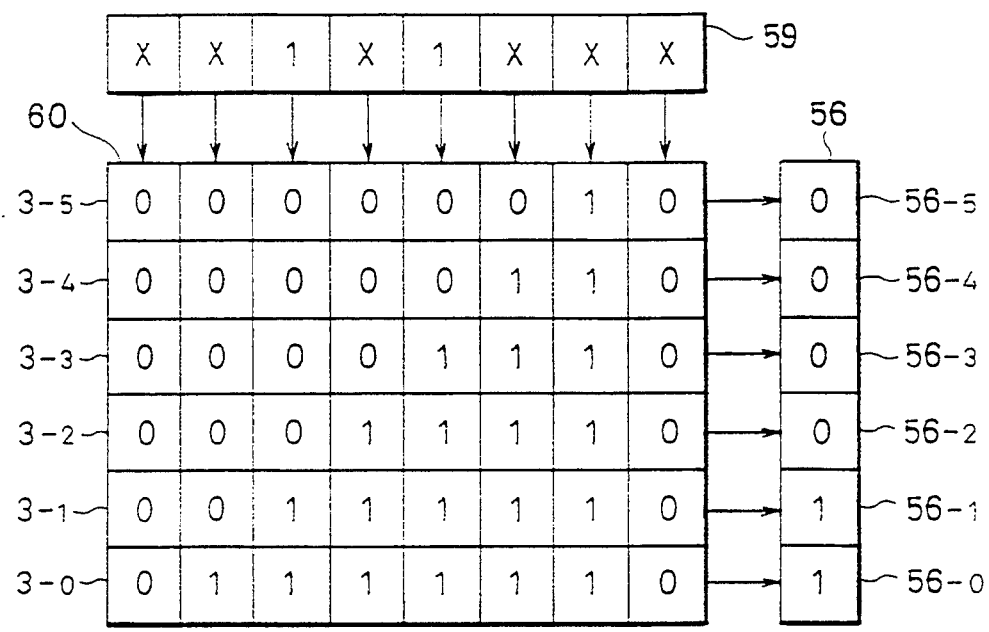
FIG. 10 is a block diagram for explaining operation of a content addressable memory (CAM) array of the semiconductor device shown in FIG. 9.

First, operation of the CAM array will be described with reference to FIG. 10. FIG. 10 shows that, in order to simplify the illustration in FIG. 9, FIG. 10 depicts retrieval data formed of 8 bits; the CAM array 60 includes memory cells arranged in 8 columns and 6 rows; and a word in the form of 8-bit data is stored in each of the rows 3-0 to 3-5 and such 8-bit data as seen in FIG. 8 are stored in the individual rows 3-0 to 3-5.

A case will be examined wherein data of (XX1X1XXX) is provided as 8-bit retrieval data to the CAM array 60 to execute a coincidence retrieving operation. Here, "1" in the 8-bit retrieval data represents coincidence with a corresponding bit stored in the CAM array 60 when the stored data bit is "1". Meanwhile, "X" in the 8-bit retrieve data represents coincidence with a corresponding bit stored in the CAM array 60 irrespective of whether the stored data bit is "1" or "0". When such 8-bit retrieval data as described above is supplied to the CAM array 60, determination of coincidence/non-coincidence is executed at each bit position of the CAM array 60.

When all 8 data bits in any row of rows 3-0 to 3-5 of CAM subarray 60 are found to be coincident with all retrieval data bits, the row outputs the logical value "1" to enable writing the logical value "1" to a corresponding bit position of the register 56.

When 8-bit data in any one of the rows 3-0 to 3-5 of the CAM subarray 60 is found to coincide with the retrieval data, the row outputs the logical value "0" to enable writing the logical value "0" to a corresponding bit position of the register 56. In the case shown in FIG. 10, all bits of the 8-bit data in the rows 3-1 and 3-0 exhibit coincidence with the retrieval data so that the logical value "1" is written into corresponding register portions 56-1 and 56-0 of the register 56.

A case will be examined wherein fuzzy inference for 2 input variables a and b, one output variable x and 2 rules is executed using the construction shown in FIG. 9. It is assumed that the CAM array 60 includes three N-bit data fields (sub-arrays) 60-1, 60-2 and 60-3 and each of the rows 3-0 to 3-15 stores a word of N bits therein. Membership functions for the input variables a and b and the output variable x are stored in the individual data fields such that they are developed in a bit mapping in a similar manner as illustratively shown in FIG. 5C. It is also assumed that membership functions for the rule 1 are stored in rows having even-numbered addresses while membership functions for the rule 2 are stored in rows having odd-numbered addresses.

The retrieval data given below are supplied to the CAM array 60 in which the membership functions are stored in such a manner as described above.

Input value $ai - 1$: $(XX \ldots X1X \ldots X) \ldots$ Field 60-1
$i$

Input value $bj - 1$: $(XX \ldots X1X \ldots X) \ldots$ Field 60-2
$j$

Output value $x0$: $(1XX \ldots X) \ldots$ Field 60-3

The retrieval data for the field 60-1 with respect to the input variable, a, presents the logical value "1" only at the i-th bit from the left in FIG. 9 and presents "X" at each of the remaining bits. Meanwhile, the retrieval data for the field 60-2 with respect to the input variable, b, presents the logical value "1" at the j-th bit of the field 60-2 from the left in FIG. 9 and presents "X" at each of the remaining bits. Further, the retrieval data for the field 60-3 with respect to the output variable x presents "1" at the first bit from the left in FIG. 9 but presents "X" at each of the remaining bits.

When such retrieval data as described above are supplied to the CAM array 60, the logical value "1" is written into register portions of the register 56 only at bit positions corresponding to those among the rows 3-0 to 3-15 of the CAM array 60 in which the i-th bit, in the field 60-1 for the input variable, a, from the left in FIG. 9 has the logical value "1" and the j-th bit, in the field 60-2 for the input variable, b, from the left in FIG. 9 has the logical value "1" and the first bit in the field 60-3 for the output variable ,x, from the left in FIG. 9 has the logical value "1".

In particular, only the rows each having the data length of 3N bits in which the i-th bit, (N+j)-th bit and (2N+1)-th bit from the most significant bit have the logical value "1" write the logical value "1" to corresponding bit positions of the register 56 while the logical value "0" is written to the remaining bit positions of the register 56.

The resulting data obtained by the operation described above and stored in the register 56 are supplied to the multiple selecting and separating encoder 26, from which 4-bit data representative of the address value of a register bit position of the register 56 having a maximum address value, that is, a highest-order bit position of the register 56 in FIG. 9, among the bit positions of the register 56 in which the logical value "1" is written, is outputted onto the signal line 31.

If the 4-bit output address value from the multiple selecting and separating encoder 26 is represented by Y0, then a membership value mx(x0) of a final output corresponding to input values ai-1 and bj-1 and an output variable value x0 is defined by an expression:

$$mx(x0) = \{Y0 - (Y0 \bmod 2)\} \div 2 + 1$$

The expression provides the same relationship as that between a final output membership value and an output address value in the case shown in FIG. 4. Accordingly, a final output membership value can be obtained by decoding a signal from the multiple selecting and separating encoder 26 using a decoder circuit.

If the non-selection signal on the signal line 32 exhibits the logical value "1", the membership value mx(x0) then is "0".

Subsequently, data wherein the second bit of the field 60-3 for the output variable x from the left in FIG. 9 is changed to the logical value "1" are supplied as retrieve data to the semiconductor device while the states of the fields for the input variables, a and b, are kept fixed. As a result, if the 4-bit output address value supplied to the signal line 31 is represented by Y1, then the final membership value mx(x1) for the modified output variable is given by $$mx(x1) = \{Y1 - (Y1 \bmod 2)\} \div 2 + 1$$

Similarly, as retrieval data for the k-th retrieval, such a data is used that only the i-th bit of the field 60-1 for the input variable, a, from the left in FIG. 9 is fixed to the logical value "1" and the j-th bit of the field 60-2 for the input variable b from the left in FIG. 9 is fixed to the logical value "1" while the k-th bit from the left of the field 60-3 for the output variable x is fixed to the logical value "1", with all of the remaining bits remaining "X". Circuit construction for deriving such retrieval data can be implemented readily using an X decoder as shown in FIGS. 4 or 7.

If the 4-bit output address value obtained by such retrieval is represented by Y(k−1), then the final membership value mx(xk−1) corresponding to the output variable value xk−1 is given by $$mx(mk-1) = \{Y(k-1) - (Y(k-1) \bmod 2)\} \div 2 + 1$$

When the logical value on the signal line 32 is "1", mx(xk−1)=0.

Accordingly, when the construction described above is employed, a final membership function mx(x) $\{x | x=0, \ldots, N\}$ with respect to the input values ai-1 and bj-1 and the output variable $x\{x | x=0, \ldots, N\}$ can be obtained by executing a retrieving operation N times from k=1 to k=N.

When a CAM array having such construction as described above is employed, the resister 56 is normally built in such a CAM, and AND gates as shown in FIGS. 4 and 7 need not be used. Accordingly, a semiconductor device which can execute a MIN operation and a MAX operation in fuzzy inference at a high speed can be obtained readily with a simple circuit construction. The sequential application of output variable x can be readily implemented by employing a latching circuit for the input variables a and b, and a counter for the output variable x.

Figure 11:
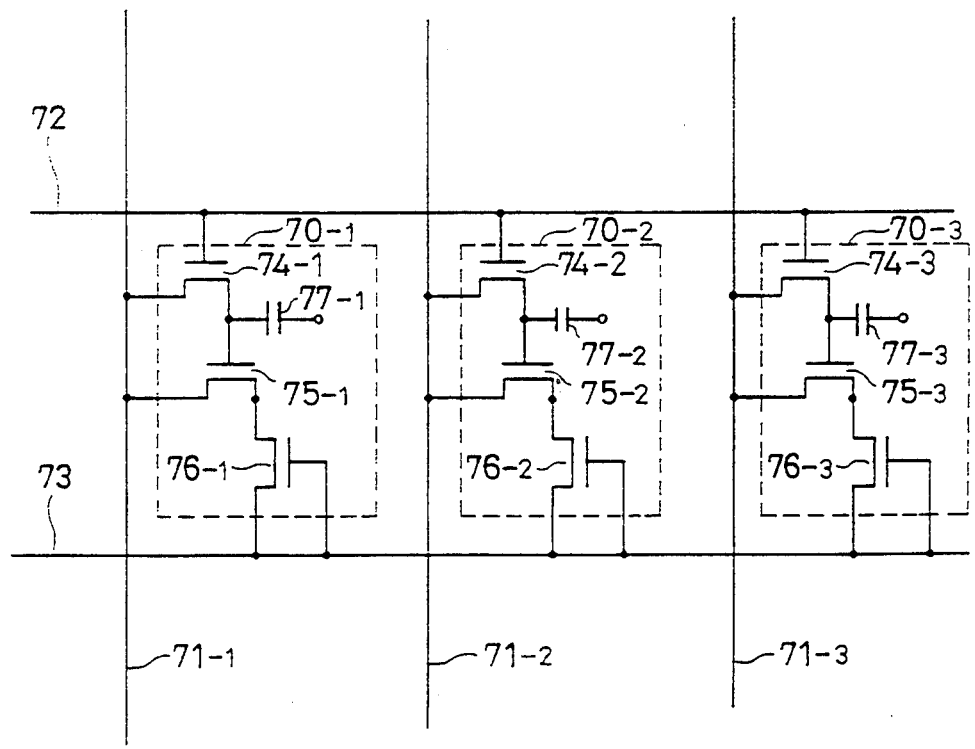
FIG. 11 is a circuit diagram showing detailed construction of an example of the CAM array of the semiconductor device shown in FIG. 9.

FIG. 11 shows an example of construction of a CAM array which enables execution of such fuzzy inference as illustrated in FIG. 9. In FIG. 11, three CAM cells 70-1 to 70-3 are shown representatively.

Referring to FIG. 11, the CAM cell 70-1 includes a capacitor 77-1 for storing information therein, an n-channel insulated gate field effect transistor 74-1 which is brought into a conducting state in response to a signal potential on a word line 72 to connect the capacitor 77-1 to an input signal line 71-1, another n-channel MIS (metal insulator semiconductor) IGFET (insulated gate field effect transistor) 75-1 which is brought into a conducting state in response to a high voltage stored in the capacitor 77-1 transmits a signal potential on the input signal line 77-1 to the output signal line 73, and a further n-channel MIS transistor 76-1 which is connected at the gate and one conduction terminal thereof to an output signal line 73 and receives at the other conduction terminal thereof a signal potential transmitted by way of the transistor 75-1. Also the CAM cells 70-2 and 70-3 have a construction similar to that of the CAM cell 70-1, and corresponding parts are denoted by like reference numerals but with hyphenated different suffix numerals added thereto. Operation of the CAM array will be described.

In the following description, the logical value "1" supplied to the input signal lines 71-1 to 71-3 corresponds to the potential level "L" while the logical "0" or "X" corresponds to the potential level "H". Now, it is assumed that the CAM cells 70-1 to 70-3 constitute a 3-bit word, that is, a row of the CAM array. A storing operation of a membership function is described first. The potential level of the output signal line 73 is first set to "L". In this condition, the potentials of "L", "H" and "L" are applied to the input signal lines 71-1 to 71-3, respectively, while the potential of the word line 72 is kept to "H". Consequently, the transistors 74-1 to 74-3 are brought into a conduction state so that the potentials of "L", "H" and "L" are transmitted to the capacitors 77-1 to 77-3, respectively. The data of (101) is stored in the CAM cell row. If such operation is repeated for all of the CAM array 60, then a membership function is stored in the CAM array 60 such that the membership function is developed in a bit mapping. Then, a retrieving operation will be described.

The output signal line 73 of the CAM array 60 in which a membership function is stored is put into an electrically floating state, and in this condition, "L", "H" and "H", that is, data (1XX), are supplied to the input signal lines 71-1 to 71-3, respectively. In this condition, the potential of the word line 72 is "L". Since the capacitors 77-1 and 77-3 are charged at the potential "L", the transistors 75-1 and 75-3 remain in an off-state. On the other hand, although the capacitor 77-2 is charged at the potential "H", the signal potential on the input signal line 71-2 is "H", and the transistor 75-2 remains in an off-state. As a result, the output signal line 73 keeps its potential "H".

It is examined now that "L", "L" and "H", that is, data (11X), are supplied to the input signal lines 71-1 to 71-3, respectively. In this instance, the transistor 75-2 is brought into a conduction state so that electric current flows from the output signal line 73 to the input signal line 71-2, and consequently the potential at the output signal line 73 is changed from "H" to "L".

Accordingly, only when retrieval data "1" is supplied to a CAM cell in which the logical value "0" is stored, does the potential level at the output signal line 73 associated with a CAM row which includes that CAM cell, change to "L". Accordingly, if the logic for the level of an output signal line is set to "1" when the potential level is "H" and the logic therefor is set to "0" when the potential level is "L", then only when plural-bit data constituting a certain row all exhibit coincidence with retrieval data bits as seen from FIG. 10, the row outputs the logical value "1".

When a membership function is stored in a memory array such that it is developed in a bit mapping as described hereinabove, a semiconductor device can be obtained wherein a MIN operation and a MAX operation can be performed at a high speed only by detecting a signal potential on each row in fuzzy inference and fuzzy inference can be executed at a high speed.

It is to be noted that, while in the embodiments described above the construction is illustrated wherein a membership function indicative of a fuzzy set in fuzzy inference is stored in a memory array such that it is developed in a bit mapping, a function to be written in a memory array such that it is developed in a bit mapping is not limited to such membership function in fuzzy inference. Generally if a construction is employed wherein all functions for which a magnitude comparing operation of function values of an input signal is performed are written in a memory array such that they are developed in a bit mapping, a magnitude comparing operation of a plurality of function values can be performed at a high speed, as shown in FIGS. 12 and 13.

Figure 12:
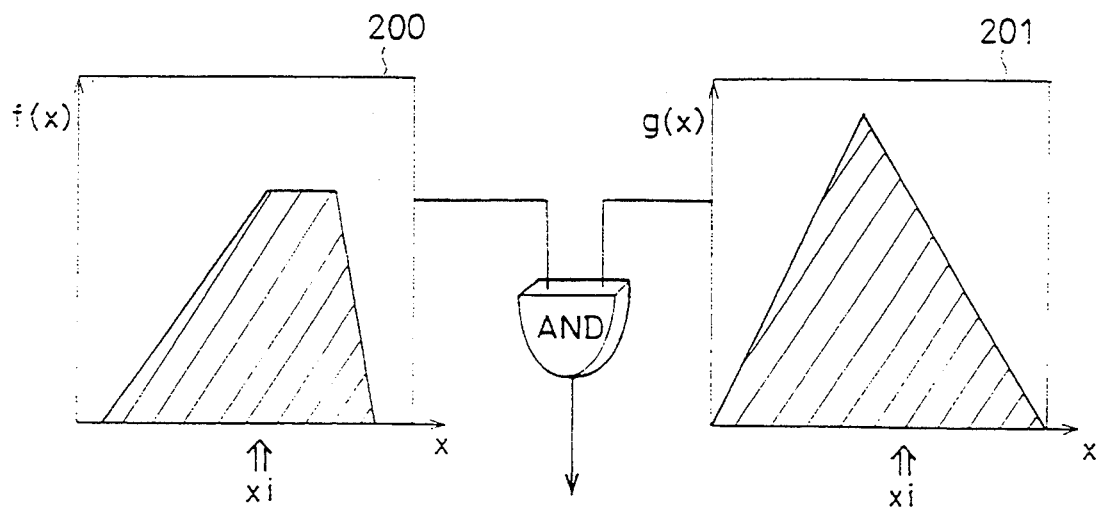
FIG. 12 shows another embodiment of the present invention.

In FIG. 12, a memory 200 stores the data of function f(x) in a bit mapping where x is an input, and a memory 201 stores the data of function g(x) in a bit mapping where x is an input. In the structure, one row is selected in response to an input xi in each of memories 200 and 201. Data on the respective same columns of the selected rows of memories are ANDed. Then, the result of minimum operation is obtained, as $Z=\min\{f(x), g(x)\}$.

Figure 13:
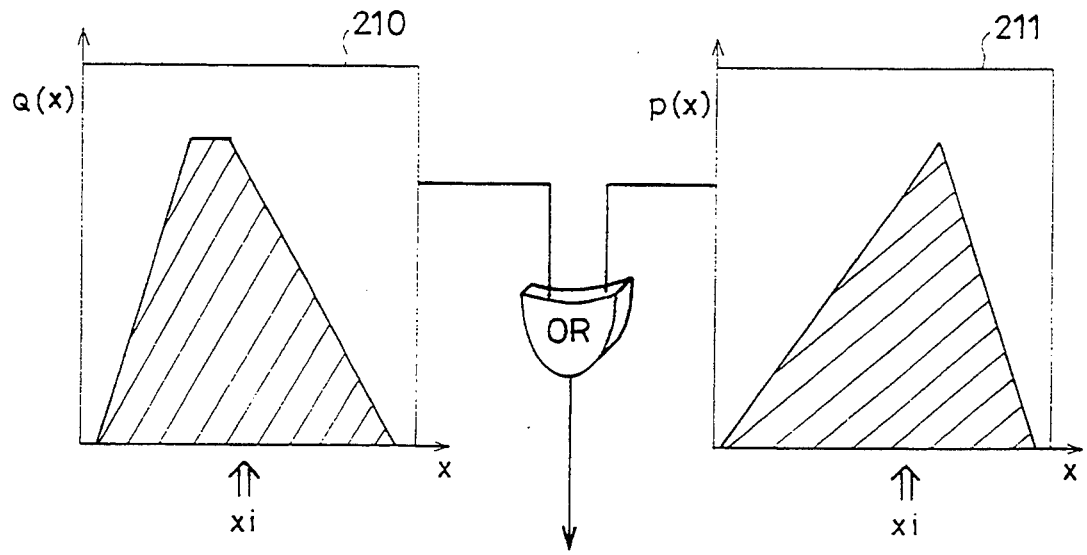
FIG. 13 shows another embodiment of the present invention.

If the data on the respective same columns of the selected rows in the memories 210 and 211 are ORed as shown in FIG. 13, the result of maximum operation of the functions P(x) and Q(x) for the input xi is obtained as $Z=\mathrm{MAX}\{P(x), Q(x)\}$.

The magnitude (values) of two or more functions can be readily compared, and therefore, desired data, such as greatest or smallest value of the magnitudes of these functions, can be provided at a high speed. In FIGS. 12 and 13, the memories 200 and 201 or the memories 210 and 211 may receive different input data such as x and y.

Further, similar effects to those of the embodiments described above can be achieved with a CAM array of any construction only if it is constituted such that it outputs matching addresses.

Further, the construction of a multiple selecting and separating encoder is not limited to that shown in FIG. 4, and if a multiple selecting and separating encoder of any other construction is employed, similar effects to those of the embodiments described above can be achieved with the multiple selecting and separating encoder only if it provides the same function.

As described so far, according to the present invention, since a construction is employed wherein a plurality of functions are stored in a memory array such that they are developed in a bit mapping and a comparison in magnitude of output function values is made in accordance with a physical positional relationship of output values in the memory array, a semiconductor device for fuzzy inference which can make a comparison in magnitude of a plurality of function values at a high speed can be obtained with a simple construction.

Further, if a membership function indicative of a fuzzy set in fuzzy inference is employed as a function to be developed in a bit mapping, a MIN operation and a MAX operation can be performed only depending upon a physical position relationship of membership values in the memory array, and accordingly, a semiconductor device for the fuzzy inference can be obtained which can execute fuzzy inference at a high speed.

In addition, if it is intended to increase the number of input and/or output variables and/or fuzzy rules, this can be settled only by increasing the memory capacity. Accordingly, a semiconductor device for the fuzzy inference can be obtained which can remarkably improve the degree of freedom in reference and has a reduced occupation area and a simplified construction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device for an operation processing, comprising:
   a first storage area including a plurality of first memory cells disposed in rows and columns for storing first data in a first bit mapping, said first data representing a first relationship between a first input signal and a first output signal, said first storage area receiving the first input signal as a column designating signal and generating the first output signal as a row designating signal, said plurality of first memory cells transferring signal potentials according to storage data onto associated rows in response to the first input signal;
   a second storage area including a plurality of second memory cells disposed in rows and columns for storing second data in a second bit mapping, said second data representing a second relationship between a second input signal and a second output signal, said second storage area receiving the second input signal as a column designating signal and generating the second output signal as a row designating signal, said plurality of second memory cells transferring signal potentials according to storage data onto associated rows in response to the second input signal; and
   means responsive to signal potentials on individual rows of said first and second storage area for determining a relationship in magnitude between the first and second output signals.

2. A semiconductor device according to claim 1, wherein the rows of said first and second storage areas have a one-to-one correspondence relationship, and said means for determining includes a plurality of detecting means each receiving signal potentials on corresponding ones of the rows of said first storage area and said second storage area to detect coincidence or non-coincidence of the signal potentials on the corresponding rows, highest-order row detecting means responsive to outputs of said plurality of detecting means for detecting a highest-order one of the rows which exhibit coincidence and outputting a row address indicative of the highest-order row thus detected, and means responsive to the row address from said highest-order row detecting means for deriving a signal indicative of a value of a smaller one of the first and second output signals.

3. A semiconductor device according to claim 1, wherein the rows of said first storage area and the rows of said second storage area have a one-to-one correspondence relationship, and said determining means includes a plurality of detectors each receiving signal potentials on corresponding ones of the rows of said first storage and said second storage area to detect coincidence or non-coincidence of the signal potentials on the corresponding rows, highest-order row detecting means responsive to outputs of said plurality of detectors for detecting a highest-order one of the rows which exhibit coincidence, and highest-order row decoding means responsive to an output of said highest-order row detecting means for outputting an address indicative of the thus detected highest-order row in the form of a binary notation.

4. A semiconductor device according to claim 3, wherein said coincidence/non-coincidence detecting means includes a plurality of logical product gates.

5. A semiconductor device according to claim 4, wherein said highest-order row detecting means includes a plurality of first logical gates each having a false input and a true input for making a logical product operation on signals received at said false and true inputs, said first logical gates being provided corresponding to said logical product gates of said coincidence/non-coincidence detecting means, each of said first logical gates being connected in such a manner as to receive at said false input thereof an output of a corresponding one of said logical product gates and receive at said true input thereof an output of an adjacent one to said corresponding first logical gate on a higher order side, one of said first logical gates which receives outputs of logical product gates associated with the highest-order rows in said first and second storage areas receiving at said true input thereof a signal fixed to the logical true, and a plurality of second logical gates provided corresponding to said logical product gates except one associated with the highest-order positions in said first and second storage areas, each of said second logical gates being connected in such a manner as to receive at one input thereof an output of a corresponding one of said logical product gates and receive at the other input thereof an output of an adjacent one of said first logical gates on the higher order side to make a logical product operation on the received signals and output a resultant signal.

6. A semiconductor device according to claim 5, wherein said highest-order row decoding means includes a plurality of transistor trains corresponding to said second logical gates, each of said transistor trains being connected so as to provide, when the output of a corresponding one of said second logical gates represents the logical true, a binary notation of an address indicative of a corresponding row.

7. A semiconductor device according to claim 1, wherein said semiconductor device is a device for executing a fuzzy operation, and the first output signal provides a membership value for the first input signal to construct a fuzzy set of a condition portion while the second output signal provides a membership value for the second input signal to construct a fuzzy set of a conclusion portion.

8. A semiconductor device according to claim 7, wherein said first storage area constituting the condition portion and said second storage area constituting the conclusion portion are separate storage arrays.

9. A semiconductor device according to claim 7, wherein said first storage area constituting the condition portion and said second storage area constituting the conclusion portion are formed in a common storage array, and said first storage area and said second storage area are disposed in an alternate relationship in said common storage array.

10. A semiconductor device according to claim 7, wherein the fuzzy operation includes a plurality of rules, and membership values of the plurality of rules are disposed in a predetermined order in each of said first and second storage areas.

11. A semiconductor device according to claim 7, wherein the first input signal includes a plurality of kind of input data, and membership values for each of the plurality of kinds of input data area arranged cyclically in an order in each of said first and second storage areas.

12. An operation method in a semiconductor device which includes a first storage area for storing first data in a first bit mapping, said first data representing a first relationship between a first input signal and a first output signal, and a second storage area for storing second data in a second bit mapping, said second data representing a second relationship between a second input signal and a second output signal, each of said first and second storage area including a plurality of memory cells disposed in columns and rows, the rows of said first storage area having a one-to-one correspondence relationship to the rows of said second storage area, comprising the steps of:

selecting a column from said first storage area using the first input signal as a column designating signal and reading out data of those of said memory cells connected to the thus selected column on individual rows;

selecting a column from said second storage area using the second input signal as a column designating signal and reading out data of those of said memory cells connected to the thus selected column on individual rows;

comparing the data read out on the individual rows of said first storage area with the data read out on corresponding rows of said second storage area to detect coincidence;

detecting a highest-order row among the rows for which coincidence has been determined at the preceding comparing step; and specifying the thus detected highest-order row to determine a relationship in magnitude between the first and second output signals and deriving a signal indicative of one of the first and second output signals in accordance with a result of such determination.

* * * * *